(12) United States Patent
Baek

(10) Patent No.: US 12,105,367 B2
(45) Date of Patent: Oct. 1, 2024

(54) DISPLAY DEVICE

(71) Applicant: LG ELECTRONICS INC., Seoul (KR)

(72) Inventor: Sangmin Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/277,495

(22) PCT Filed: Jan. 14, 2022

(86) PCT No.: PCT/KR2022/000747
§ 371 (c)(1),
(2) Date: Aug. 16, 2023

(87) PCT Pub. No.: WO2022/177170
PCT Pub. Date: Aug. 25, 2022

(65) Prior Publication Data
US 2024/0152000 A1    May 9, 2024

(30) Foreign Application Priority Data

Feb. 18, 2021 (KR) ........................ 10-2021-0022065

(51) Int. Cl.
*G02F 1/1333* (2006.01)
*G02F 1/13357* (2006.01)

(52) U.S. Cl.
CPC .. *G02F 1/133314* (2021.01); *G02F 1/133608* (2013.01); *G02F 1/133603* (2013.01)

(58) Field of Classification Search
None
See application file for complete search history.

(56) References Cited

U.S. PATENT DOCUMENTS

| | | | |
|---|---|---|---|
| 8,104,909 B2 * | 1/2012 | Shin ................... | G02F 1/133608 362/249.02 |
| 2010/0079977 A1 * | 4/2010 | Lee ................... | G02F 1/133611 362/97.1 |

FOREIGN PATENT DOCUMENTS

| JP | 5331214 B2 | 10/2013 |
|---|---|---|
| KR | 10-2010-0037346 A | 4/2010 |
| KR | 10-2016-0139215 A | 12/2016 |
| KR | 10-2017-0083248 A | 7/2017 |
| KR | 10-2018-0107465 A | 10/2018 |

* cited by examiner

*Primary Examiner* — Richard H Kim
(74) *Attorney, Agent, or Firm* — Birch, Stewart, Kolasch & Birch, LLP

(57) ABSTRACT

Disclosed is a display device. The display device of the present disclosure may include: a display panel; a frame located at a rear of the display panel; a substrate located between the display panel and the frame; a light source located on the substrate; and a supporter which is adjacent to one side of the substrate, which is coupled to the frame, and which has a groove into which the one side of the substrate is inserted, wherein the supporter may include: a body extending along the one side of the substrate, and located between the substrate and the frame; and a holder including a protruding portion that protrudes forward from a front surface of the body, and an extension portion that extends from a distal end of the protruding portion in a direction intersecting the body and the protruding portion, wherein the groove is formed between the extension portion and the body.

14 Claims, 28 Drawing Sheets

[FIG. 1]
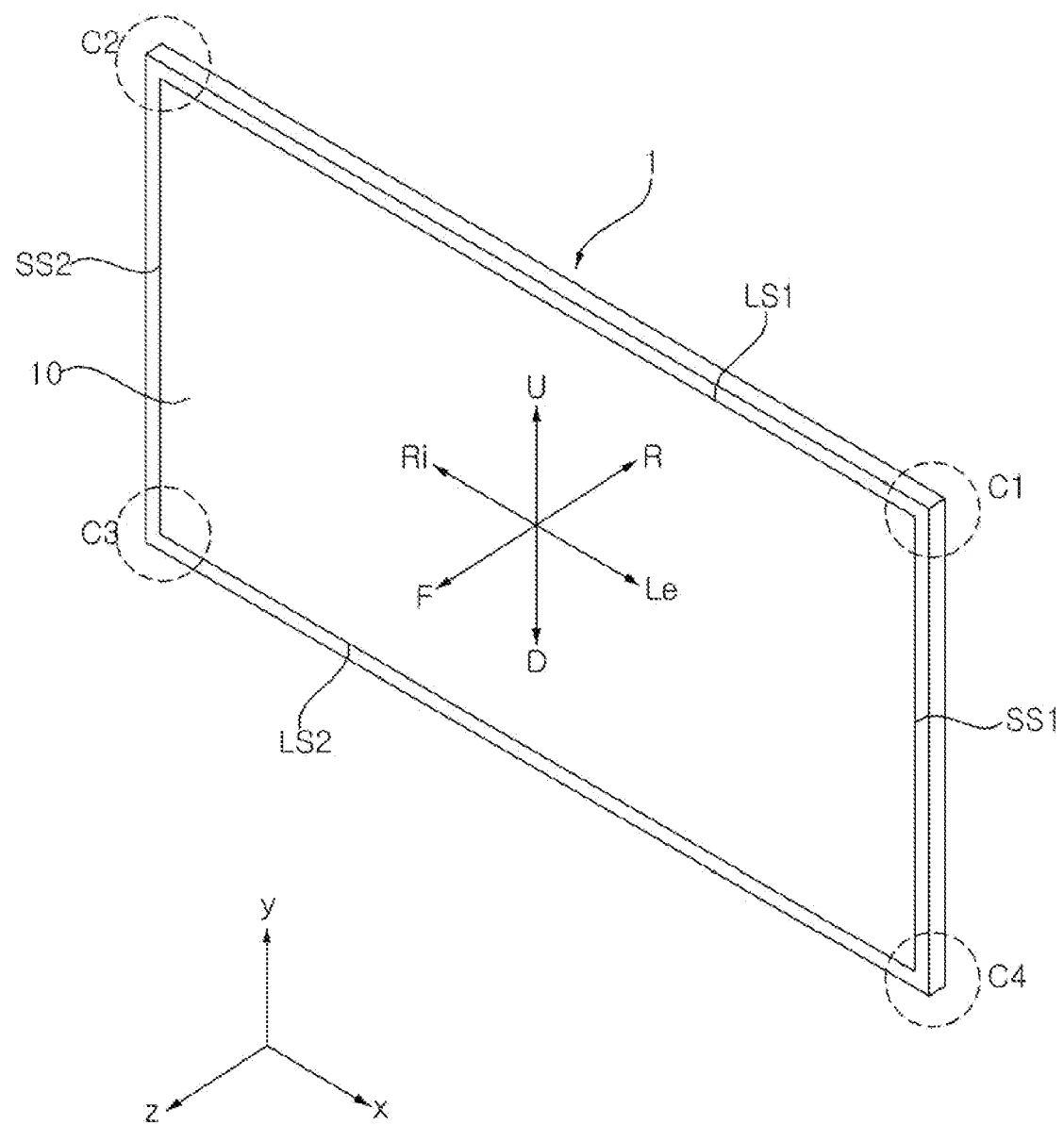

[FIG. 2]
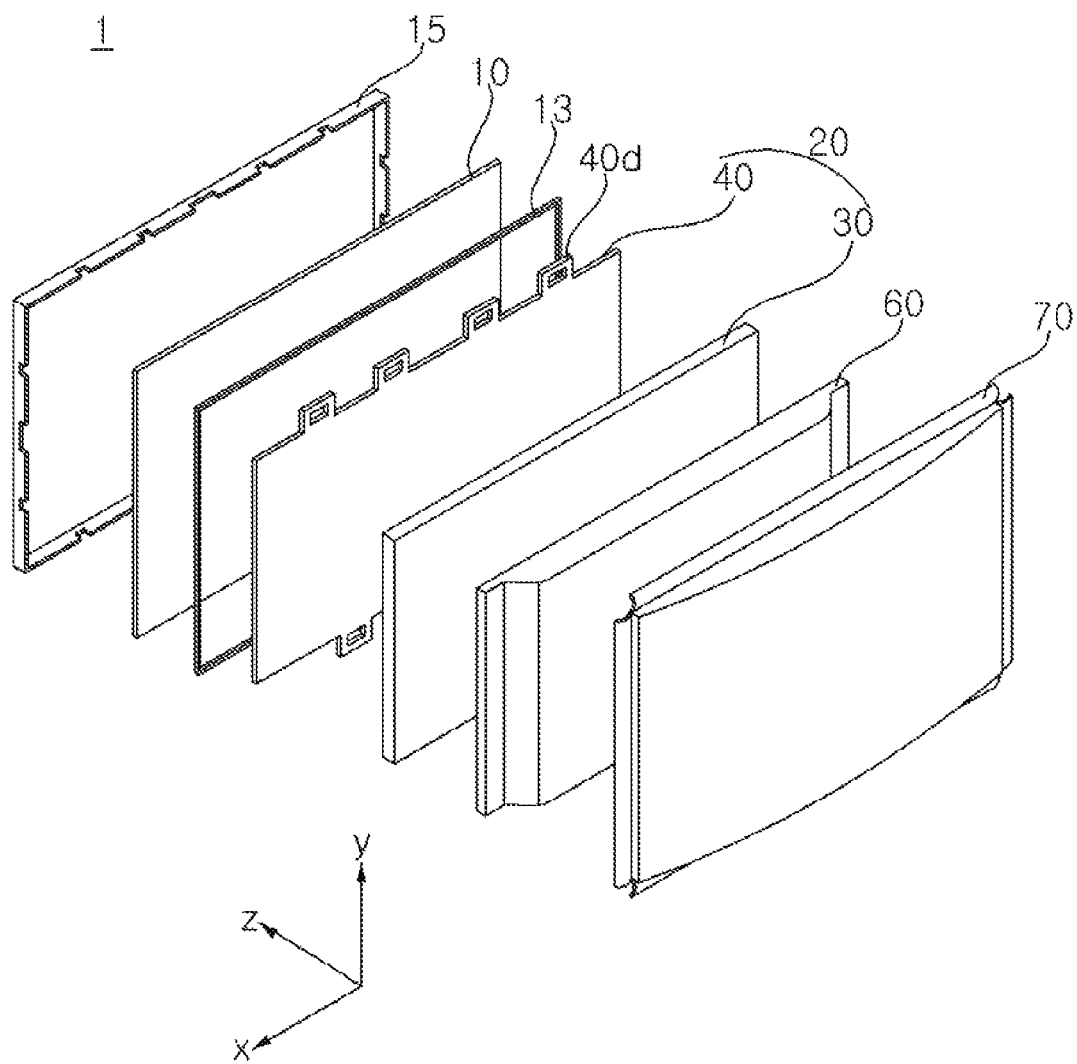

[FIG. 3]
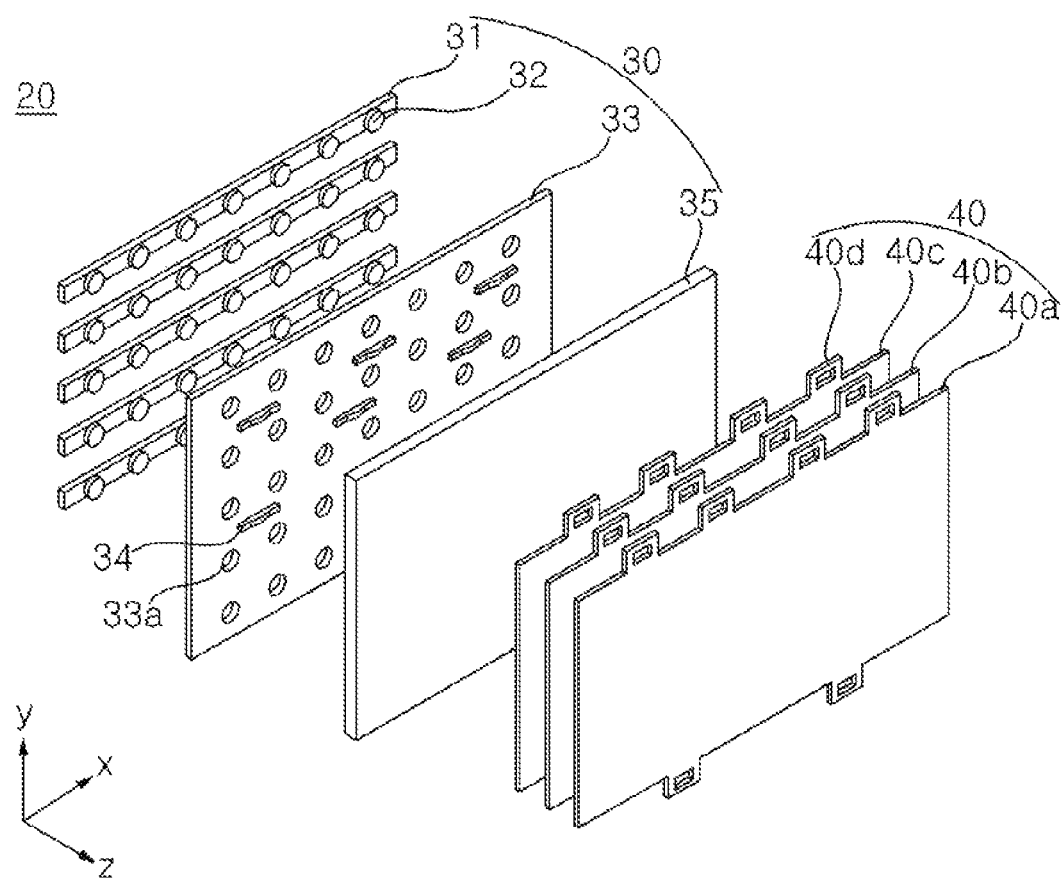

[FIG. 4]
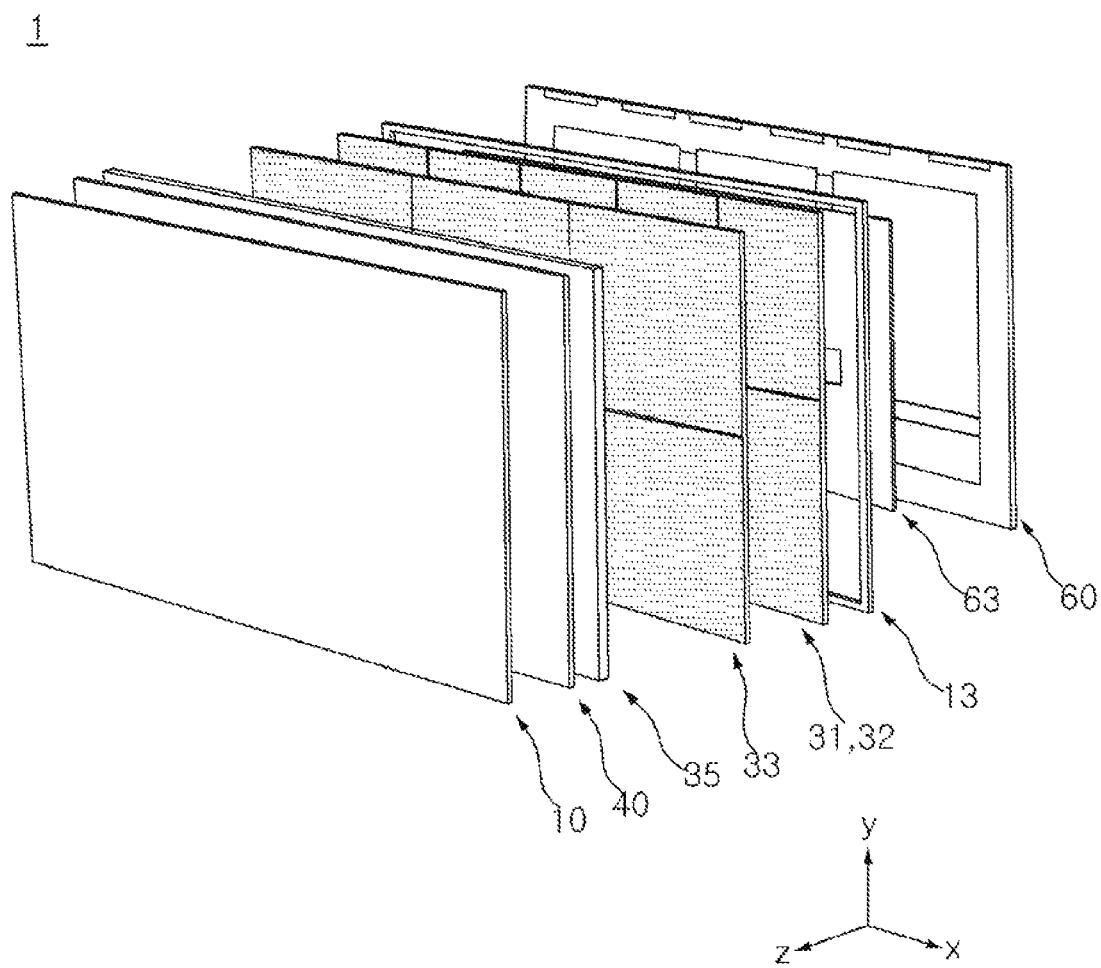

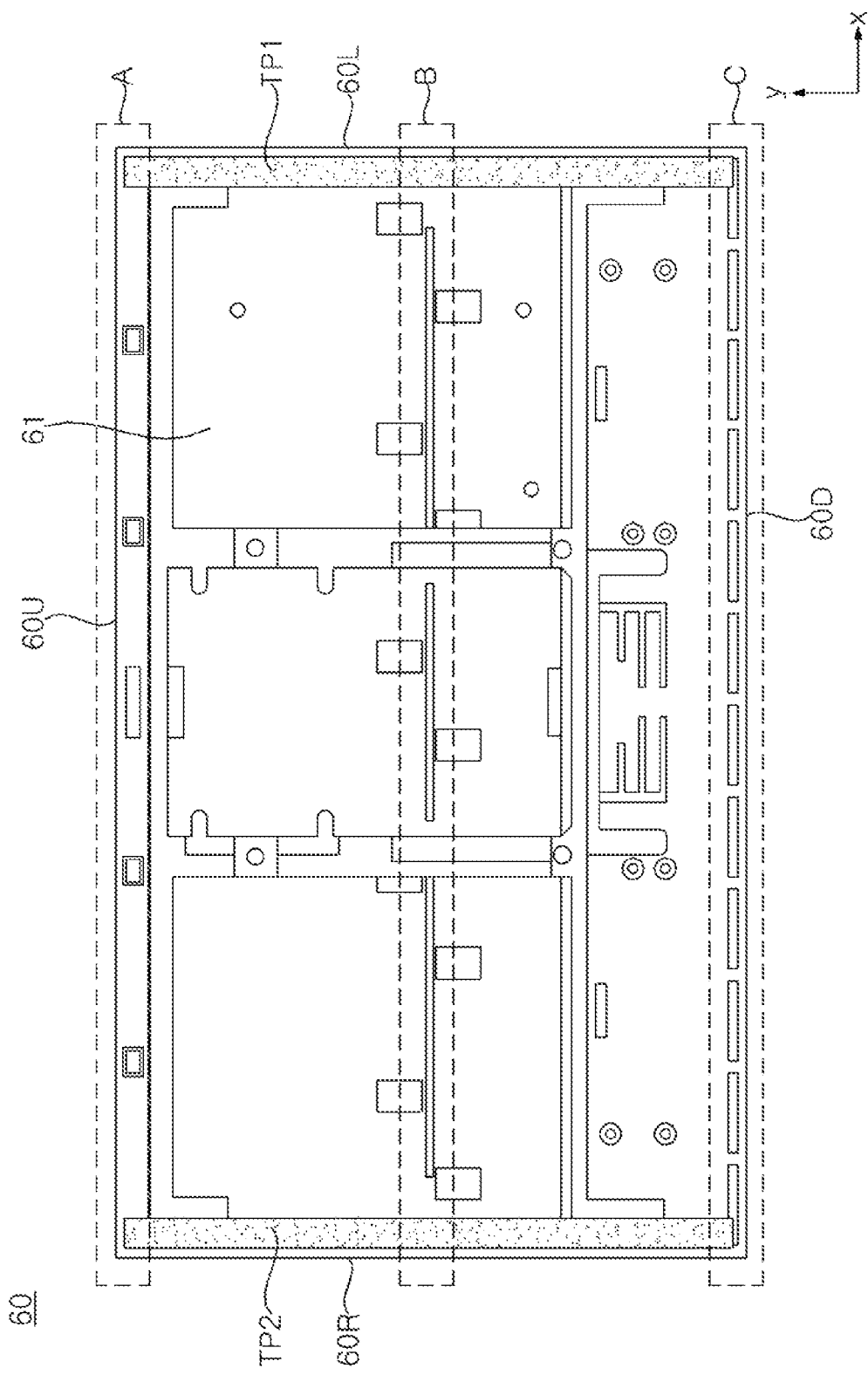
[FIG. 5]

[FIG. 6]
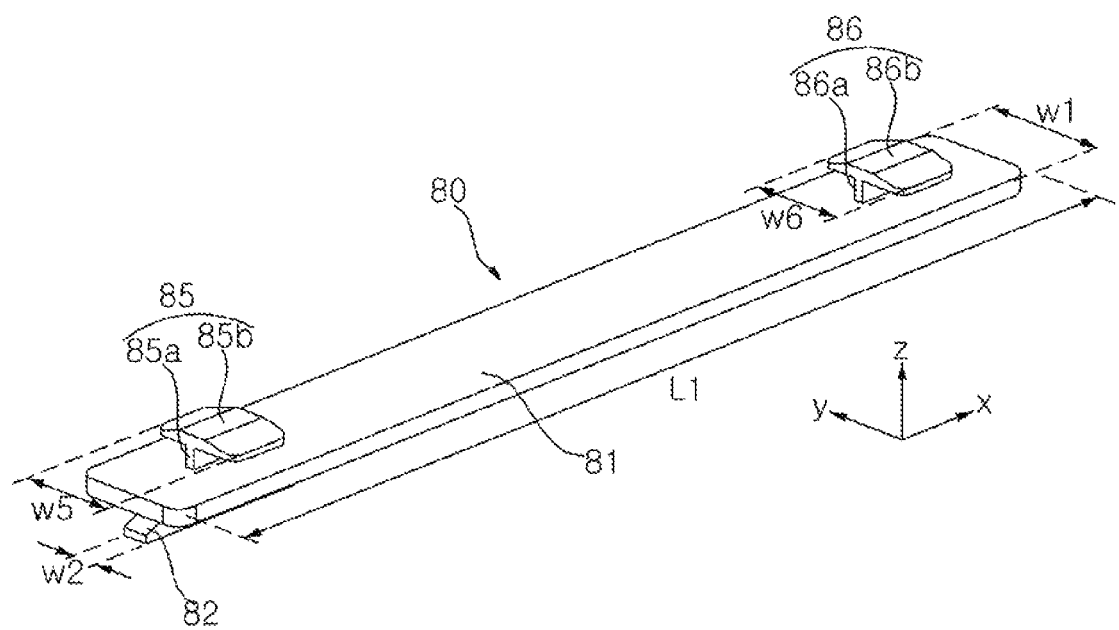

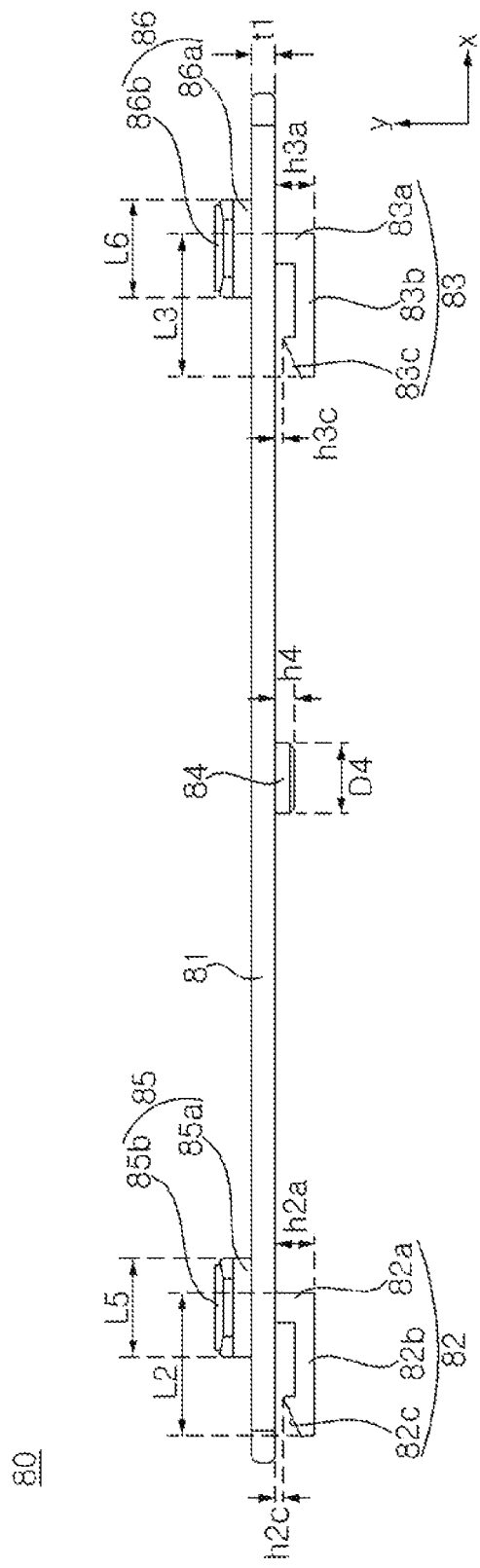
[FIG. 7]

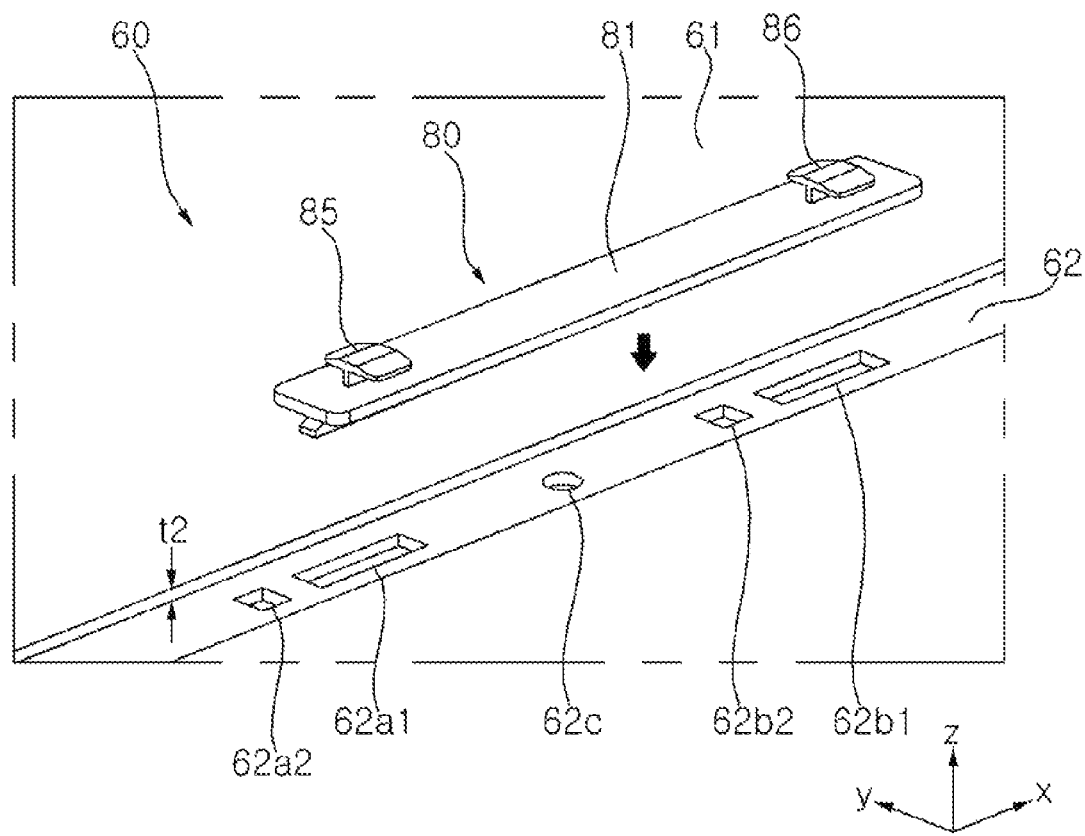
[FIG. 8]

[FIG. 9]
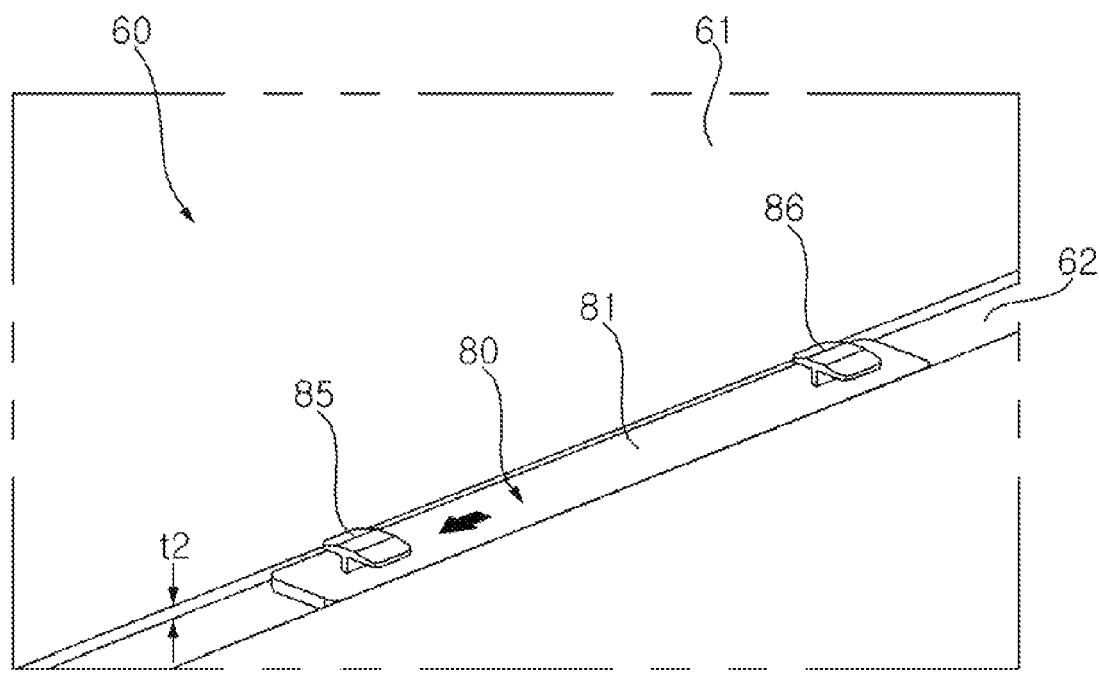

[FIG. 10]
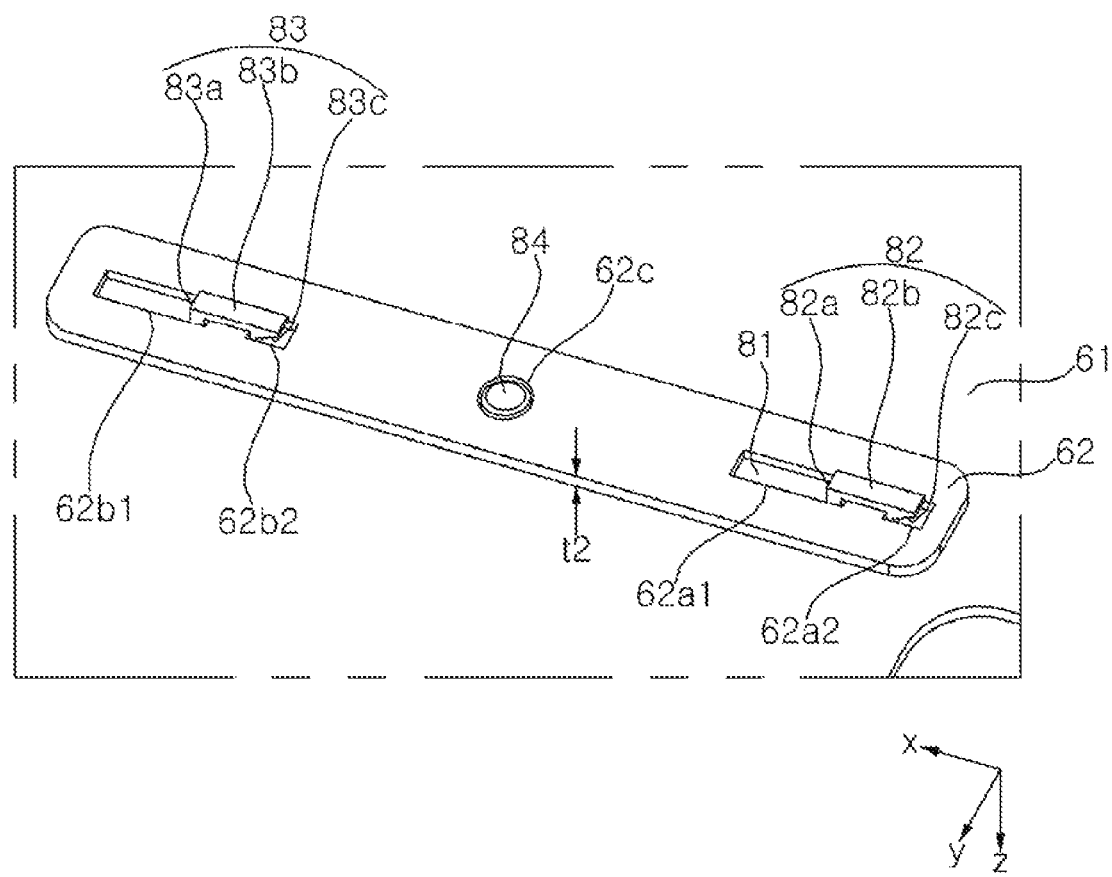

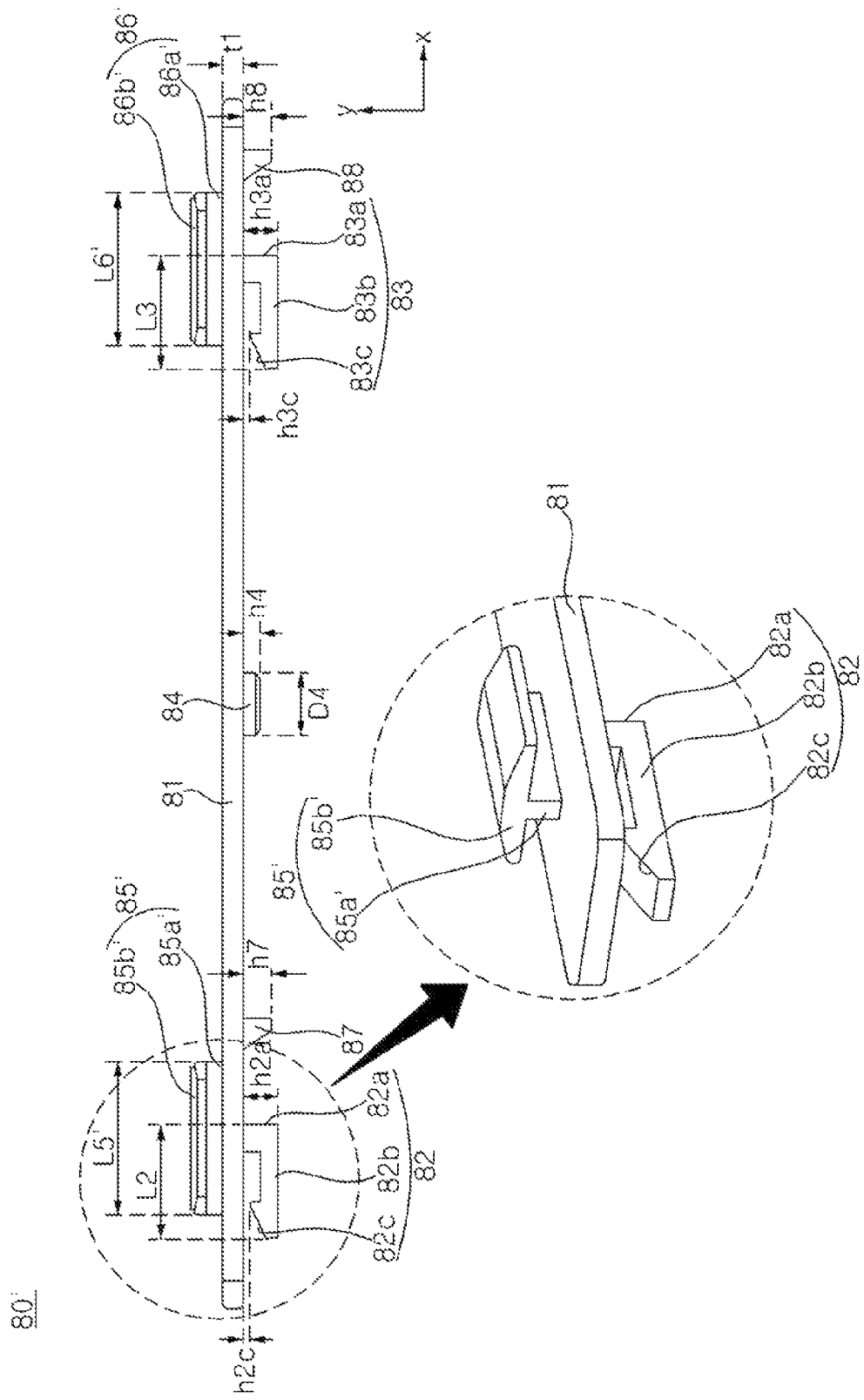
[FIG. 11]

[FIG. 12]
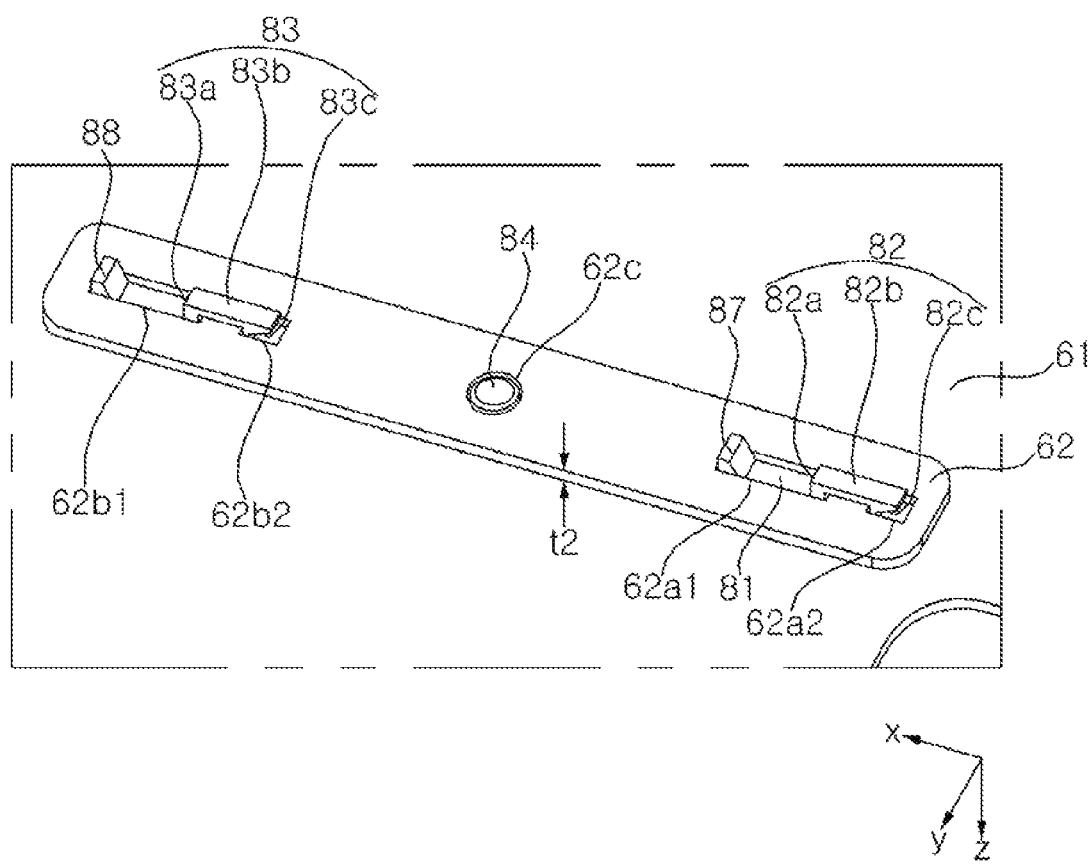

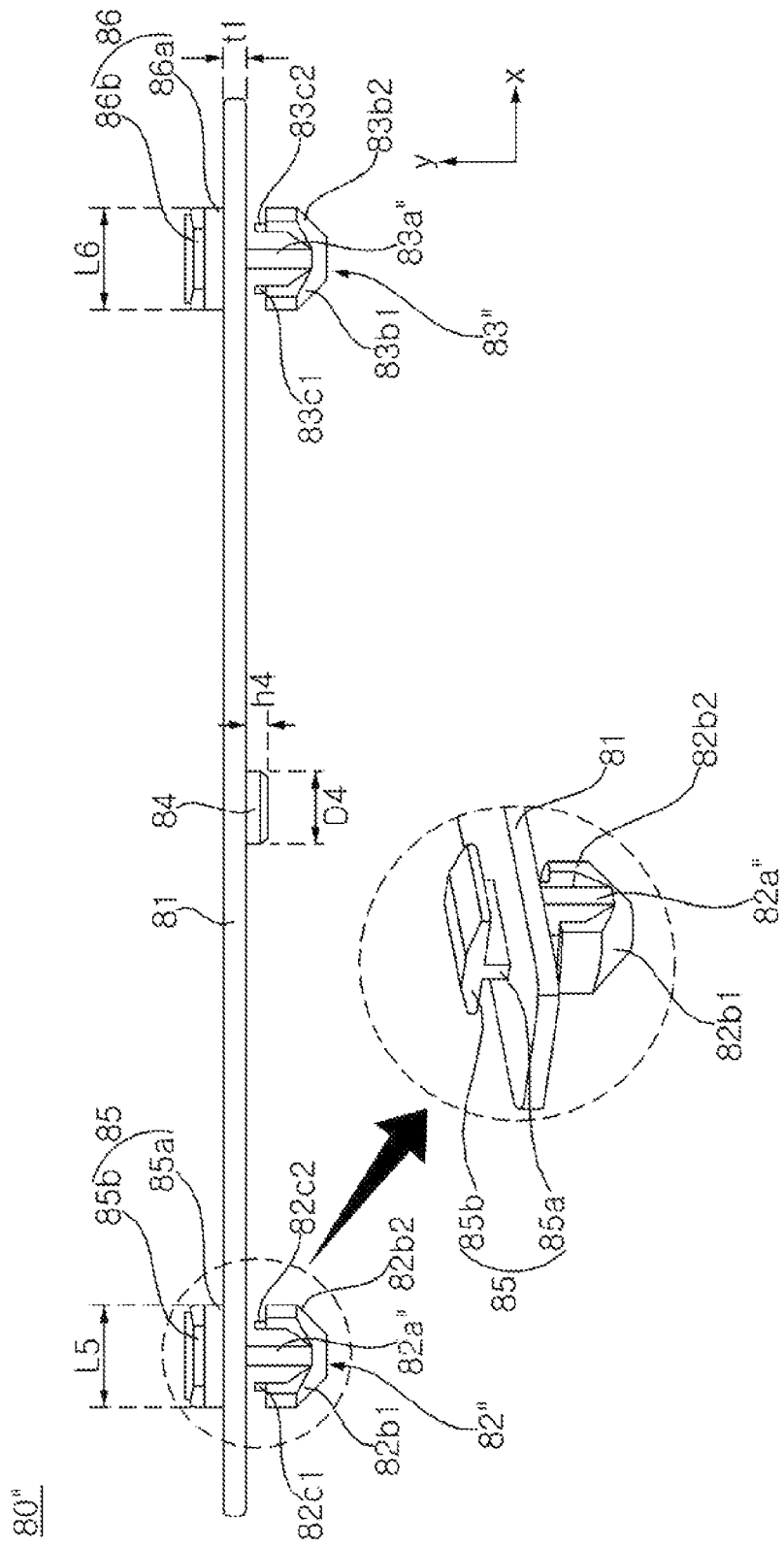
[FIG. 13]

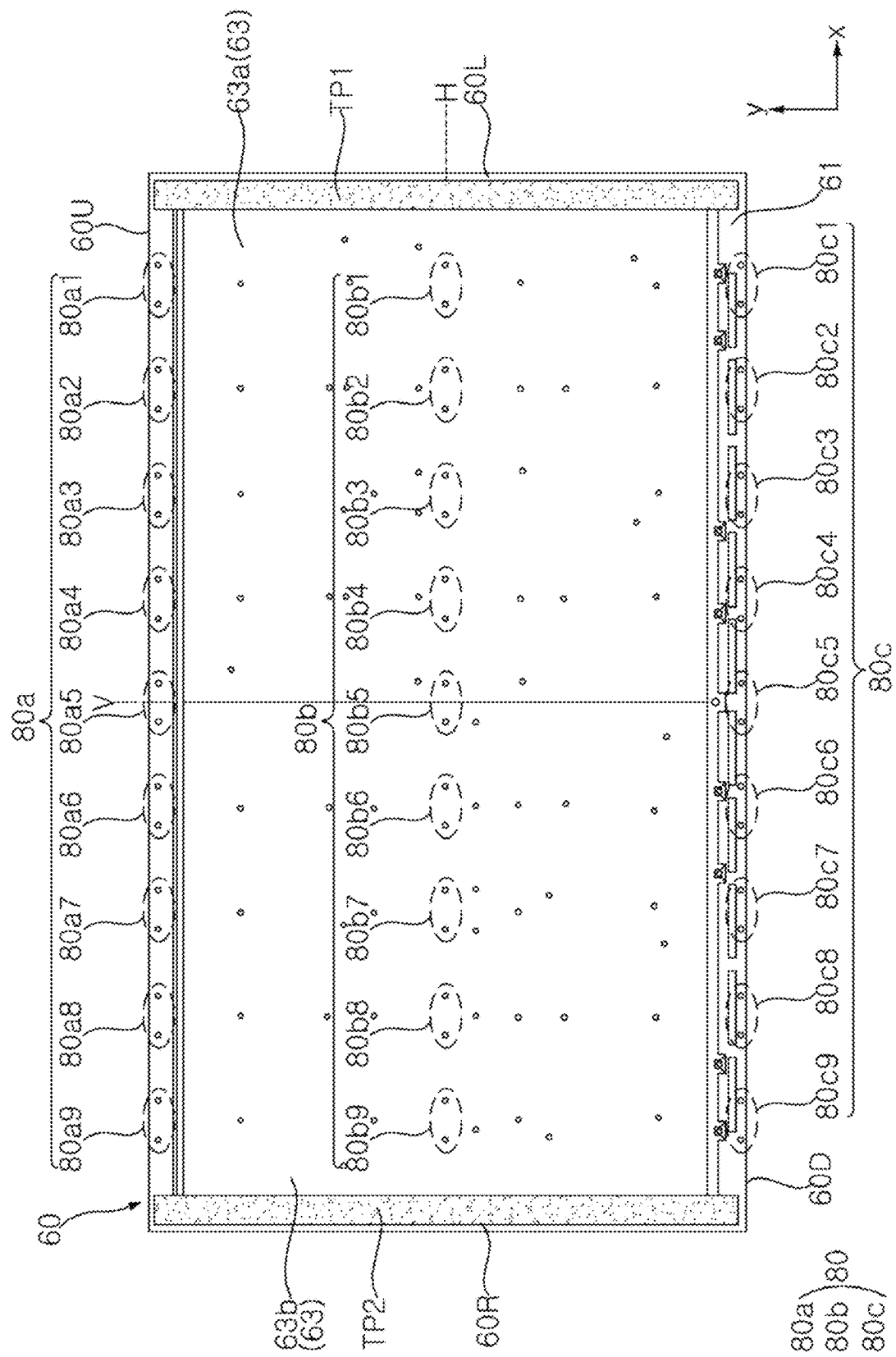
[FIG. 14]

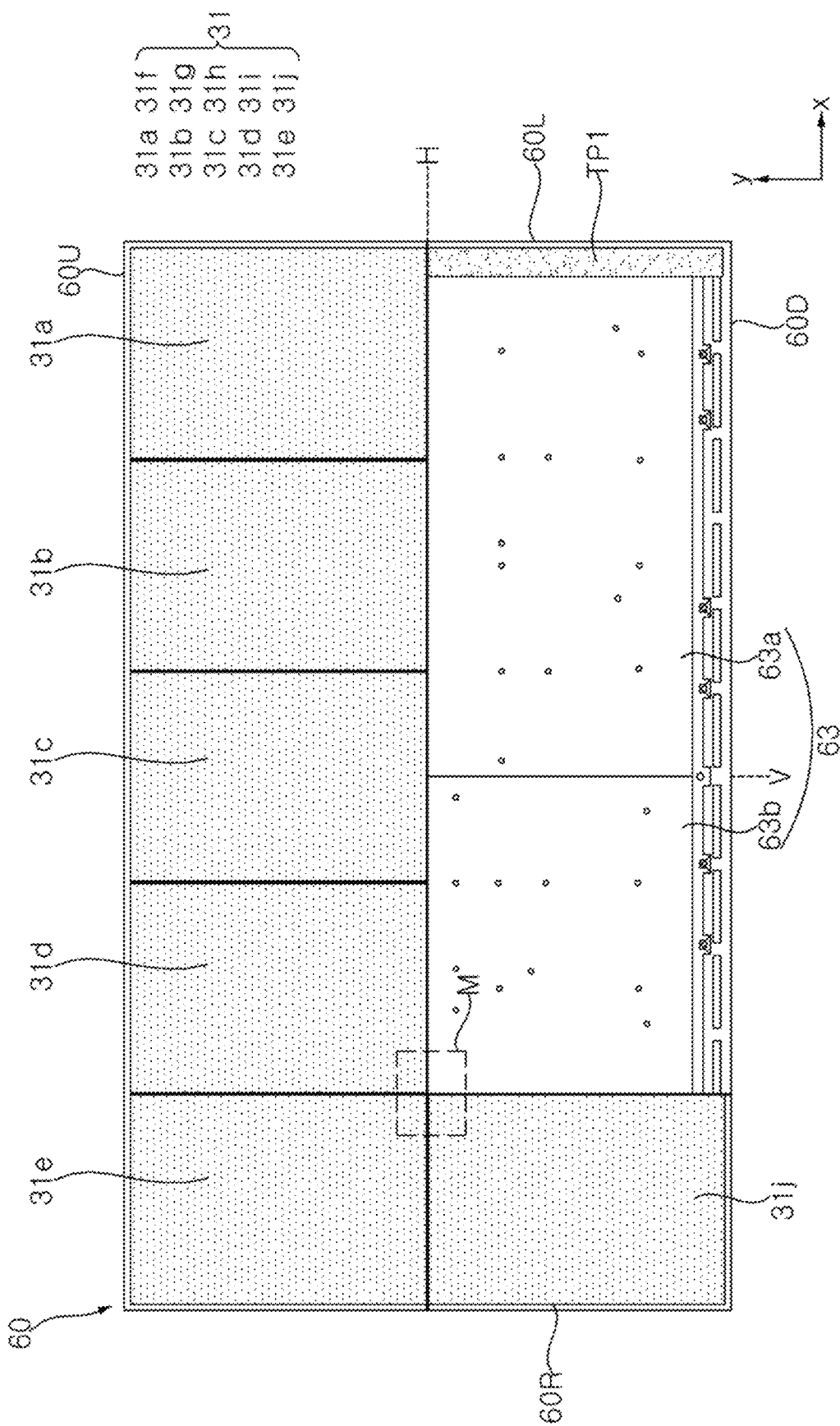
[FIG. 15]

[FIG. 16]
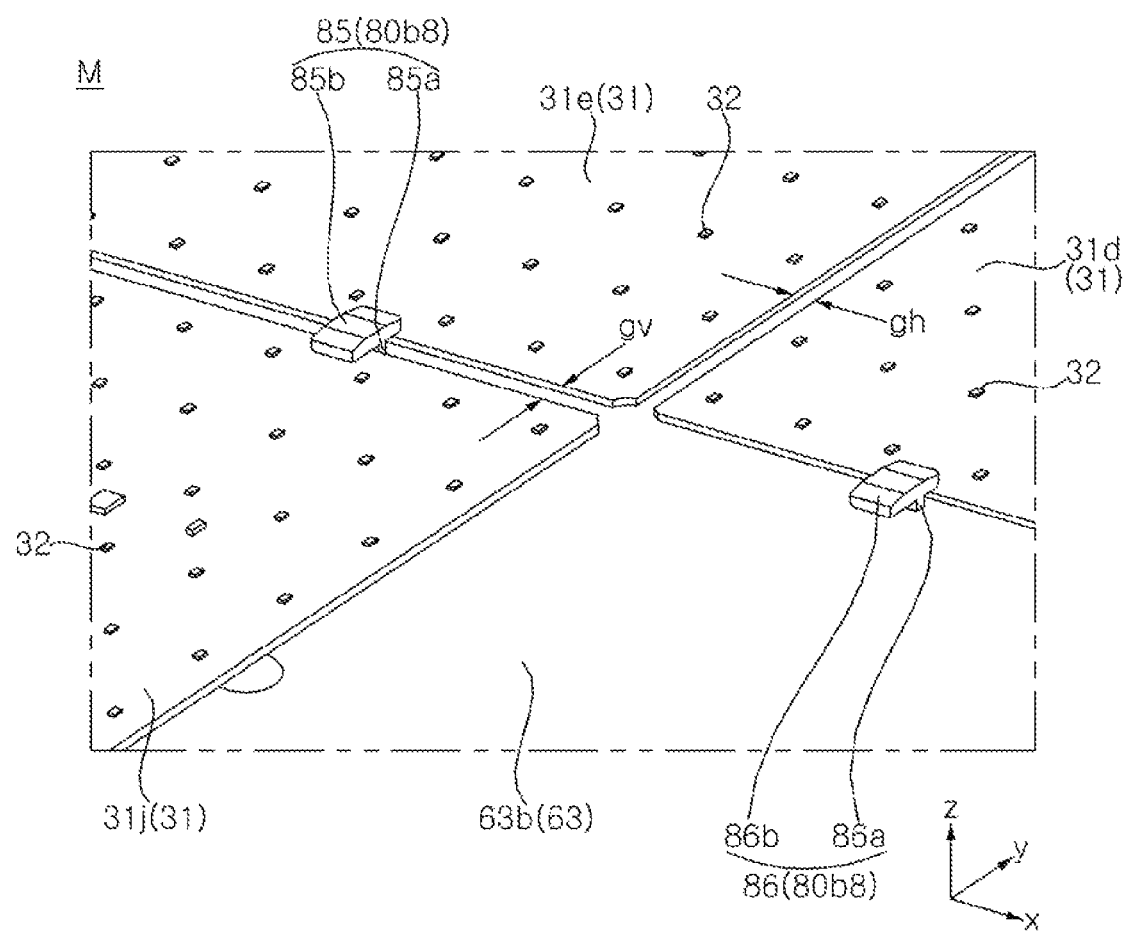

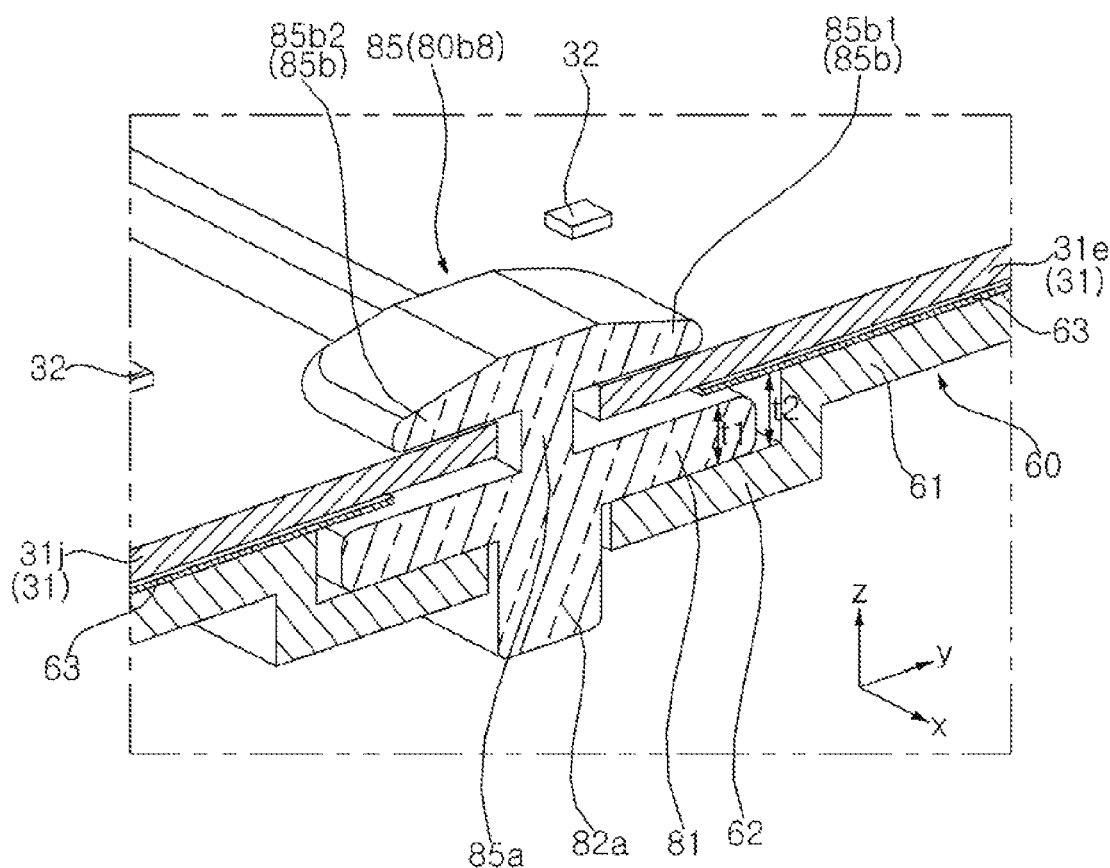
[FIG. 17]

[FIG. 18]
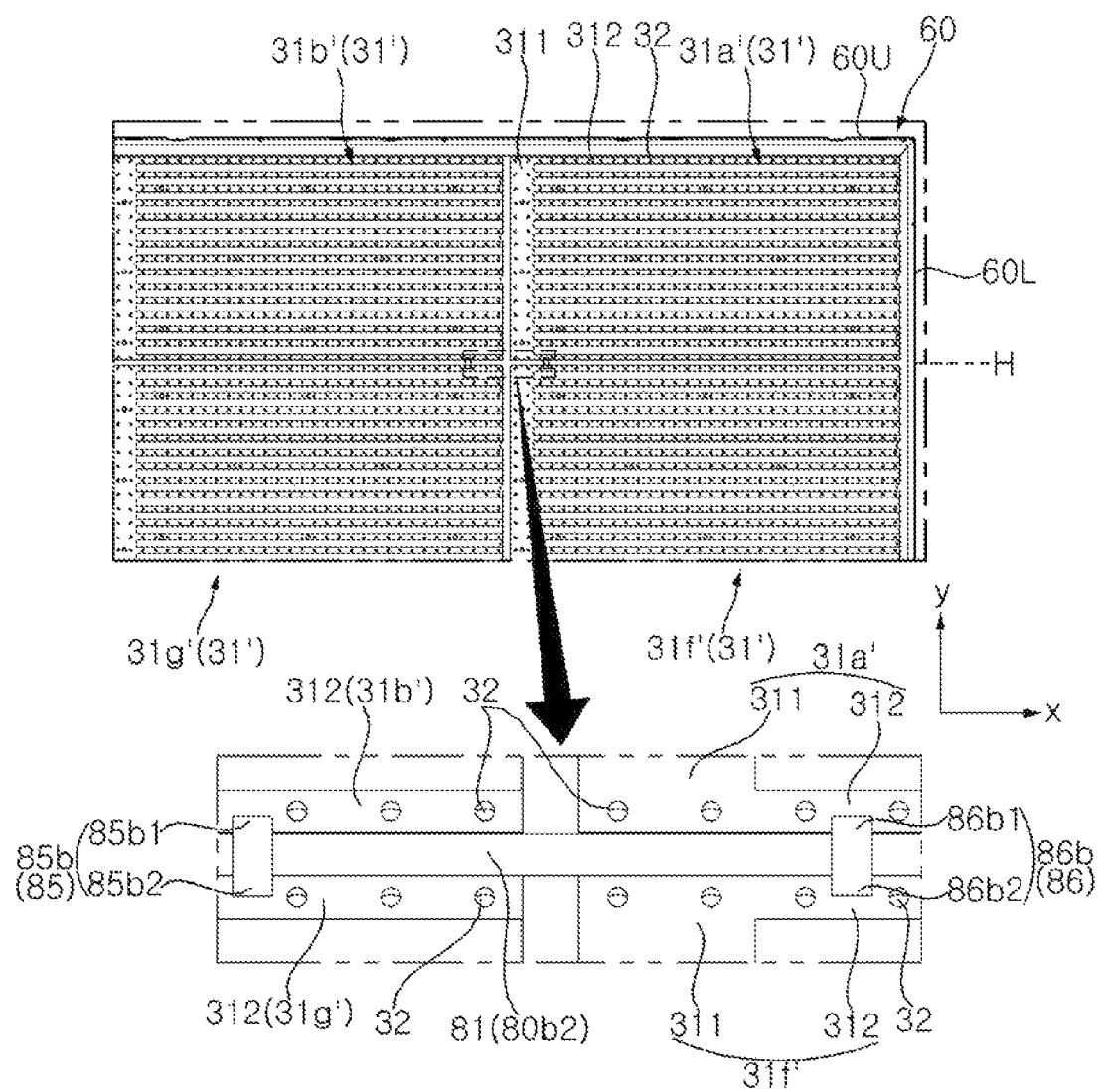

[FIG. 19]
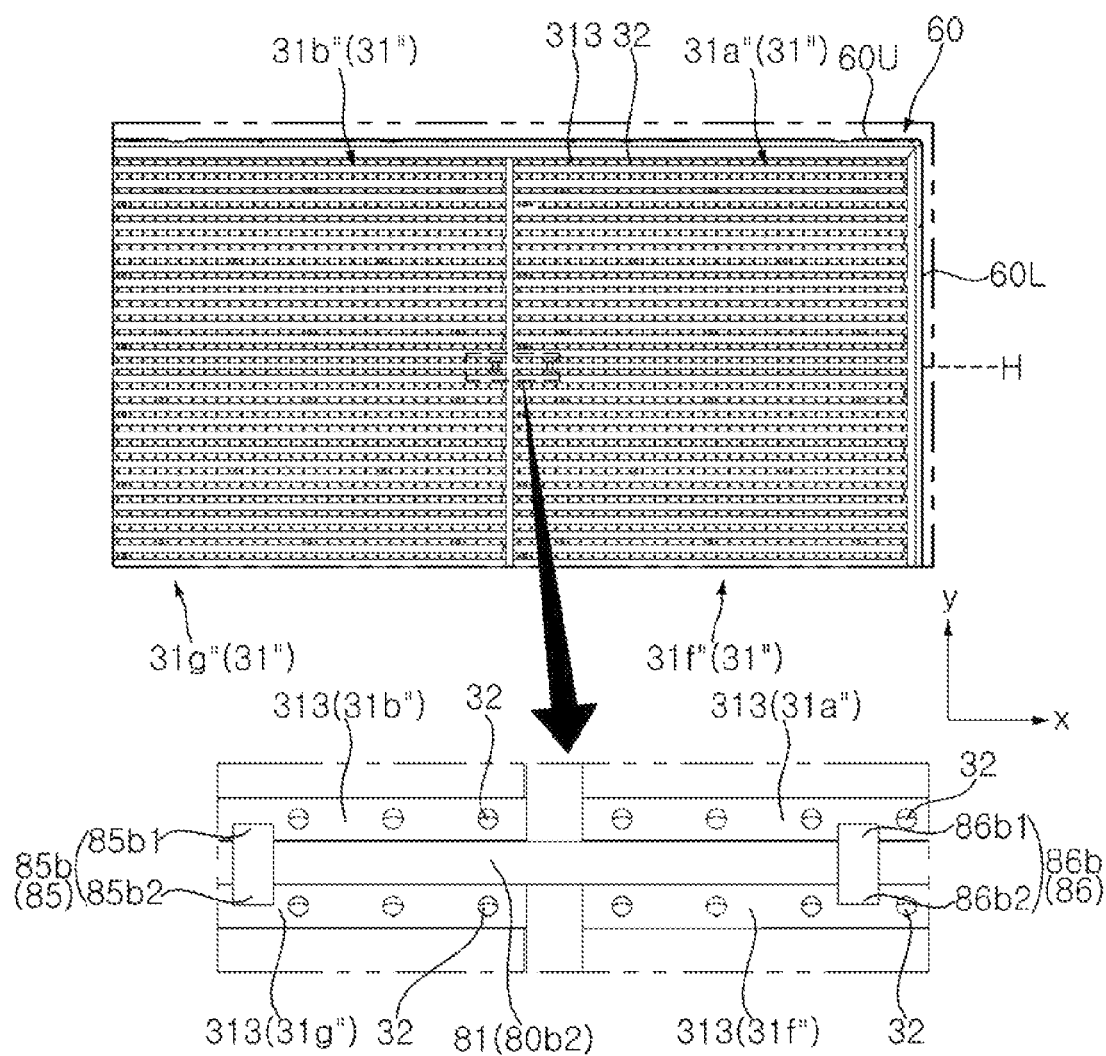

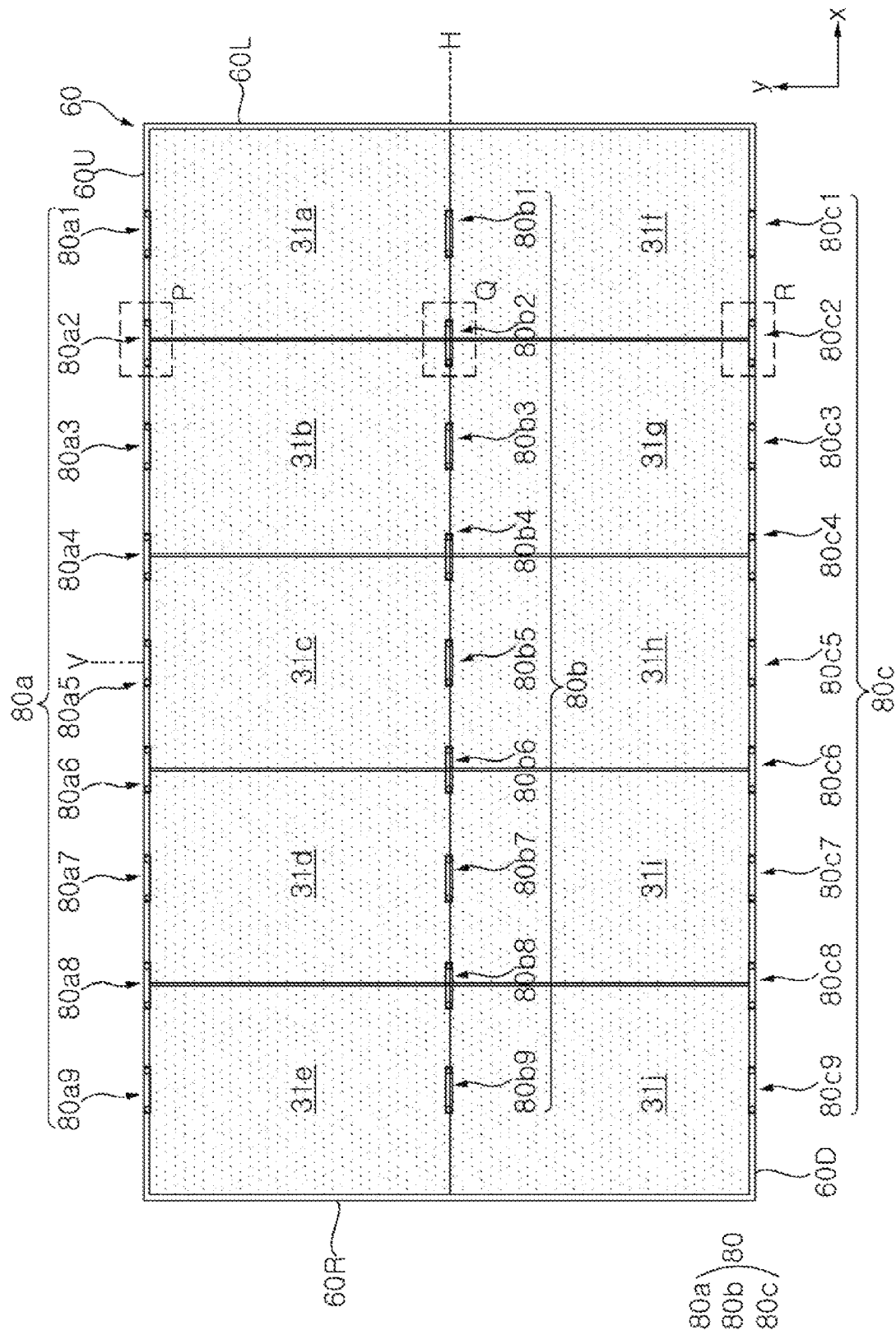
[FIG. 20]

[FIG. 21]
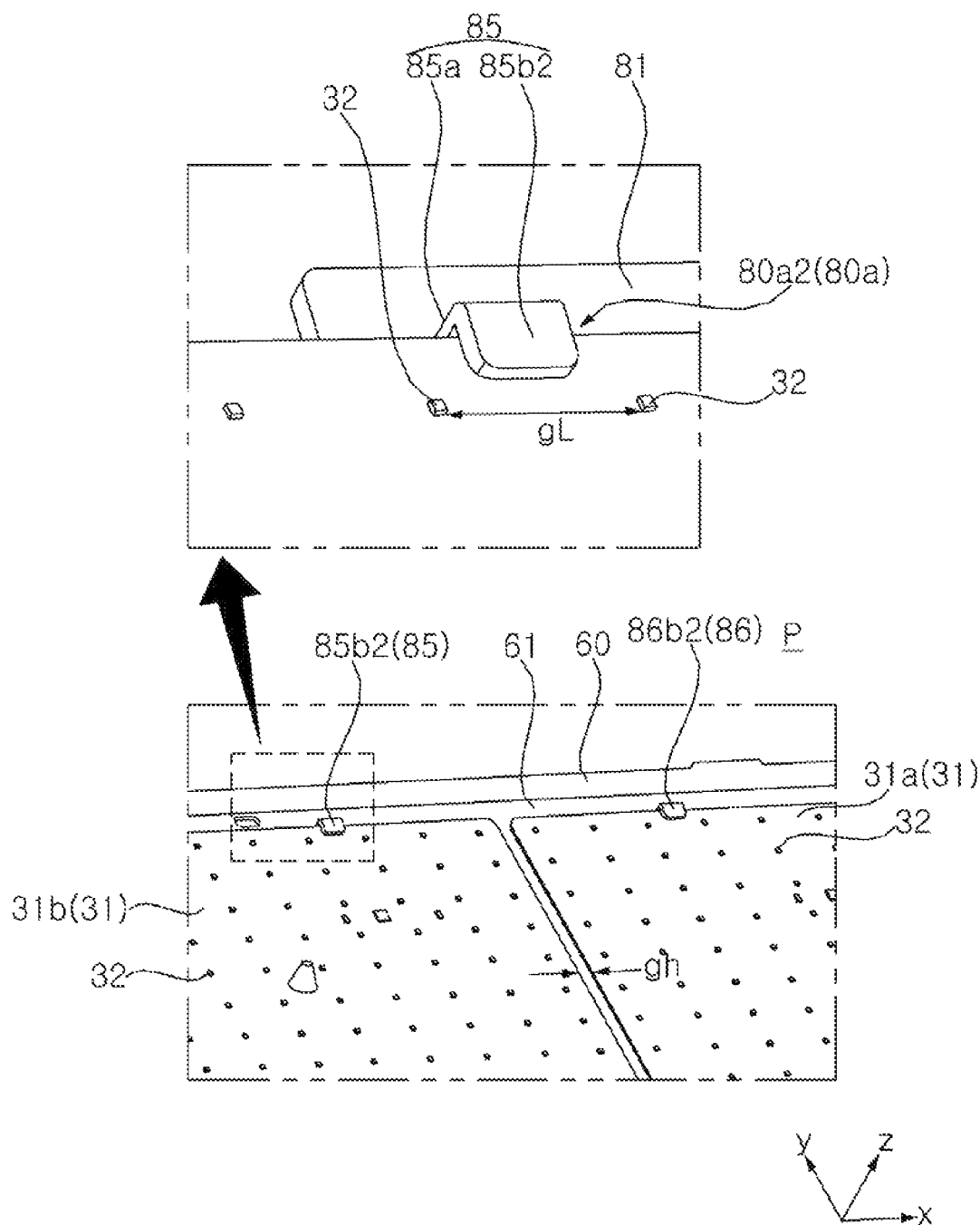

[FIG. 22]
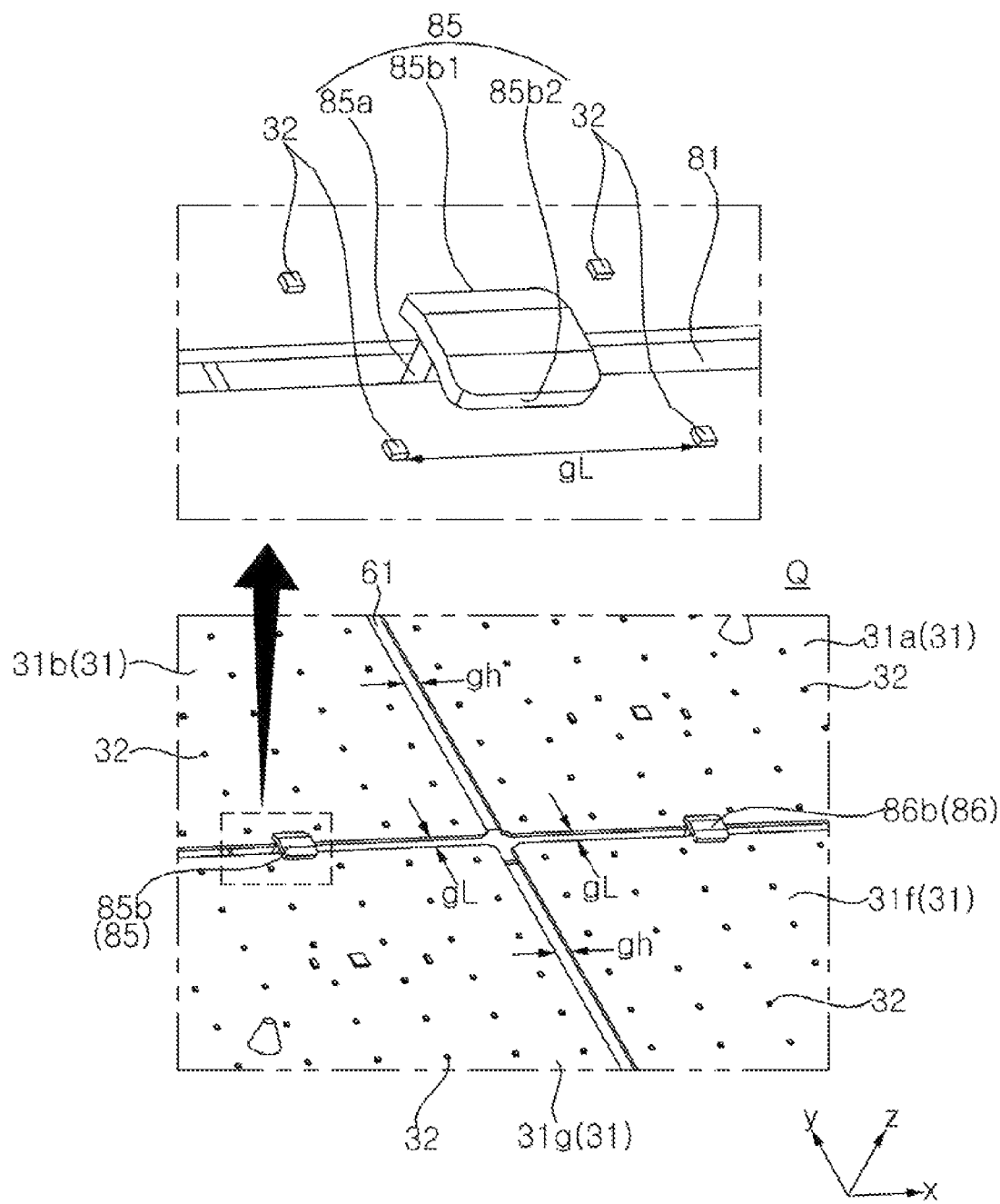

[FIG. 23]
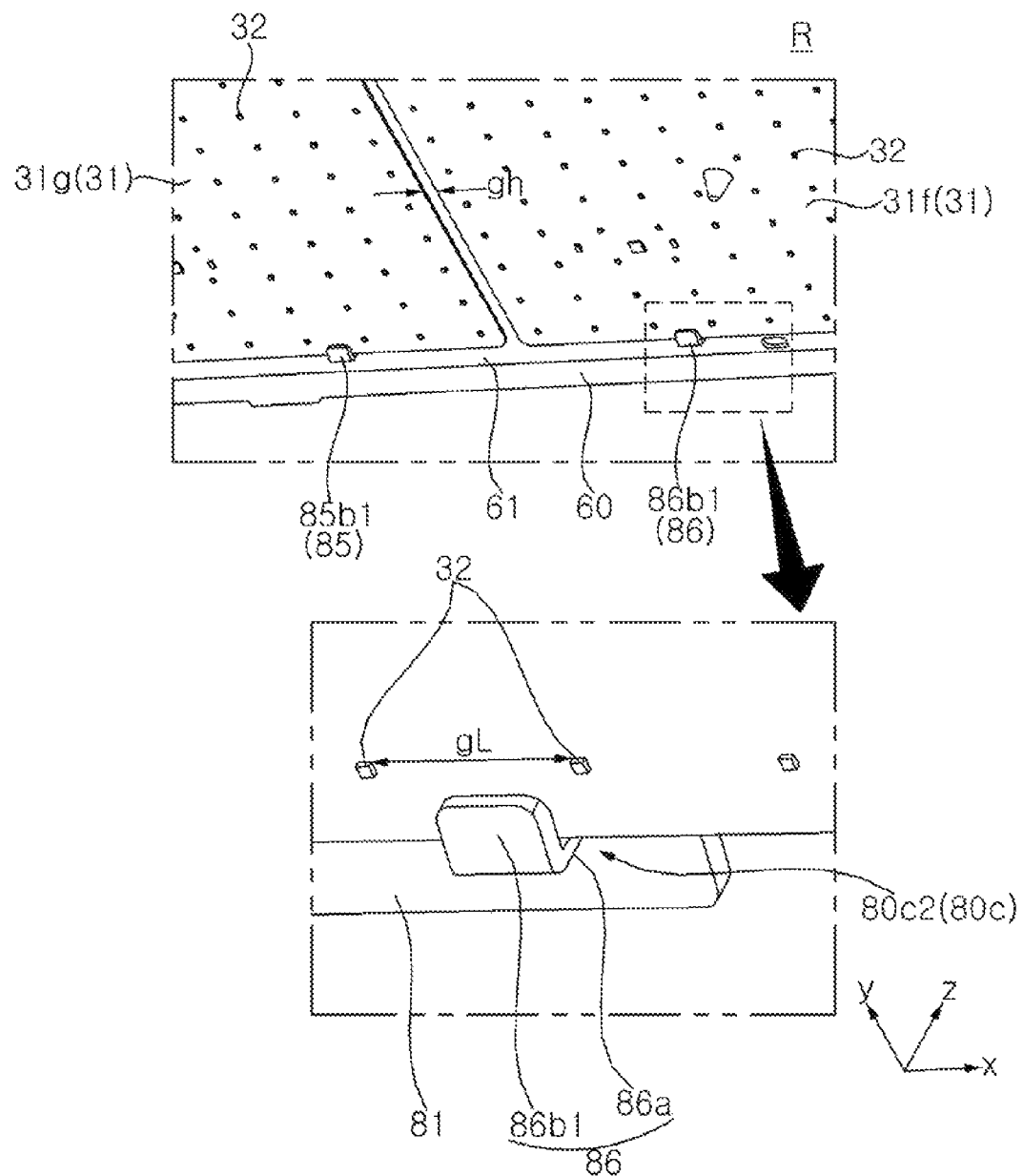

[FIG. 24]
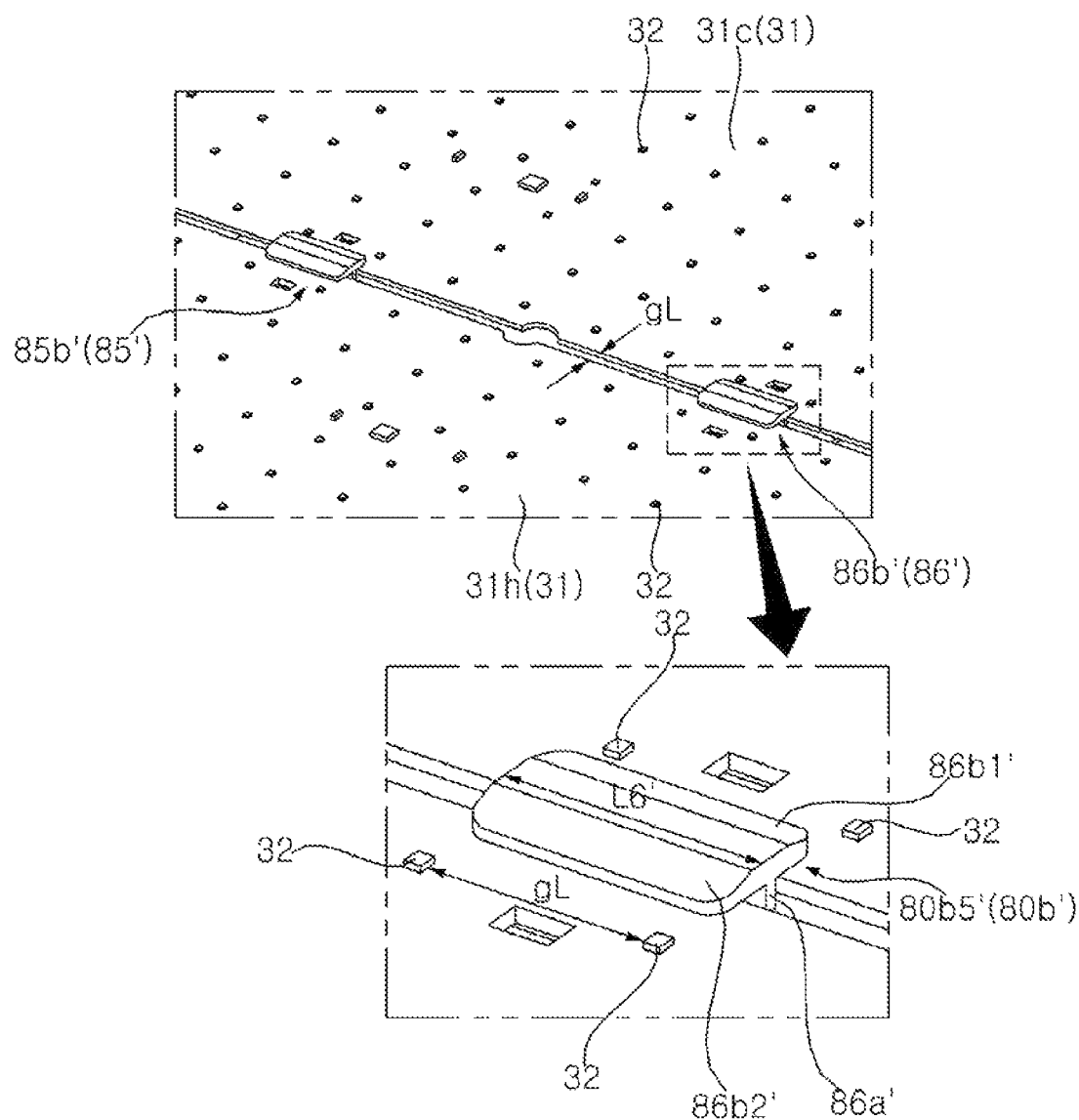

[FIG. 25]
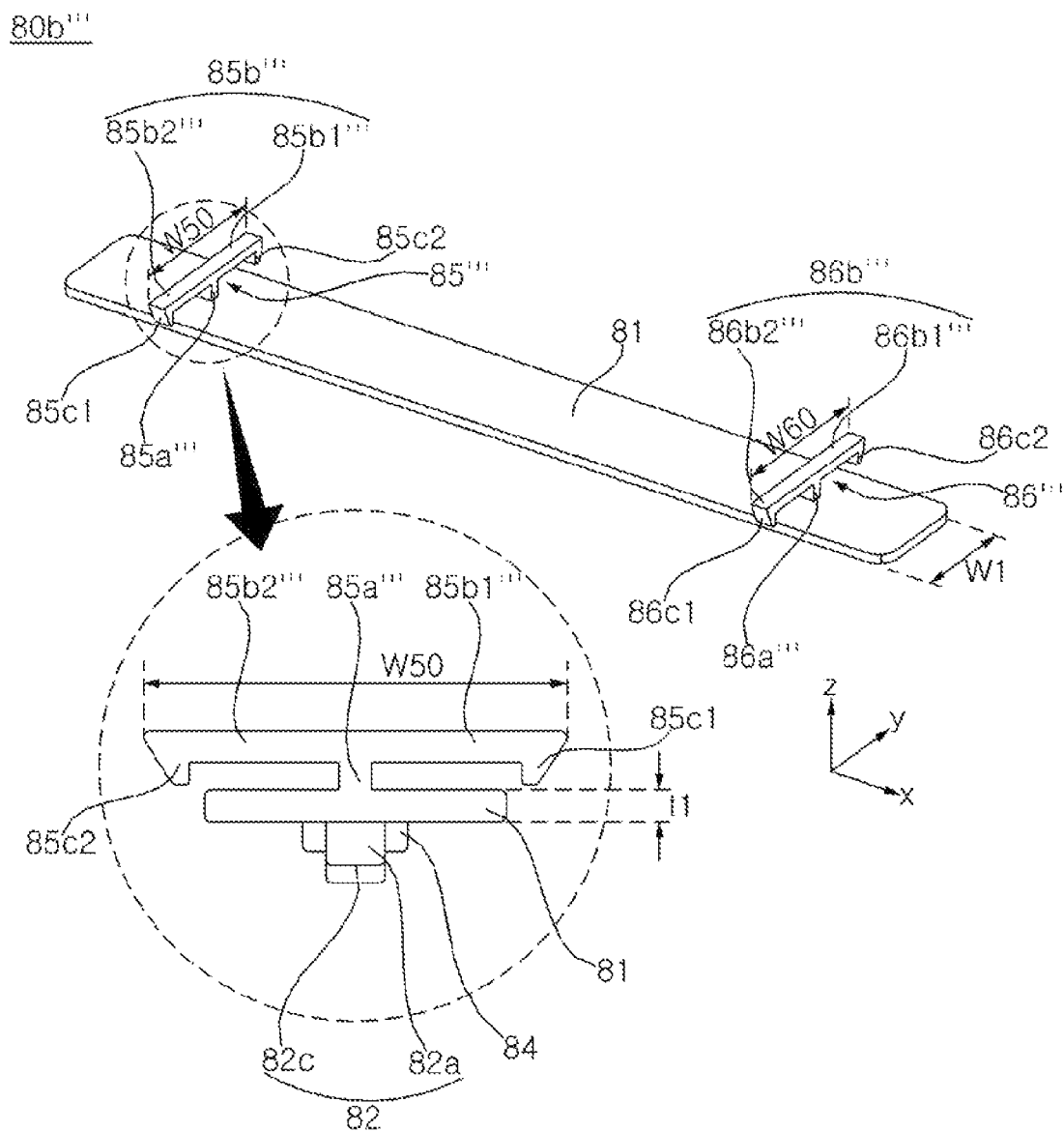

[FIG. 26]
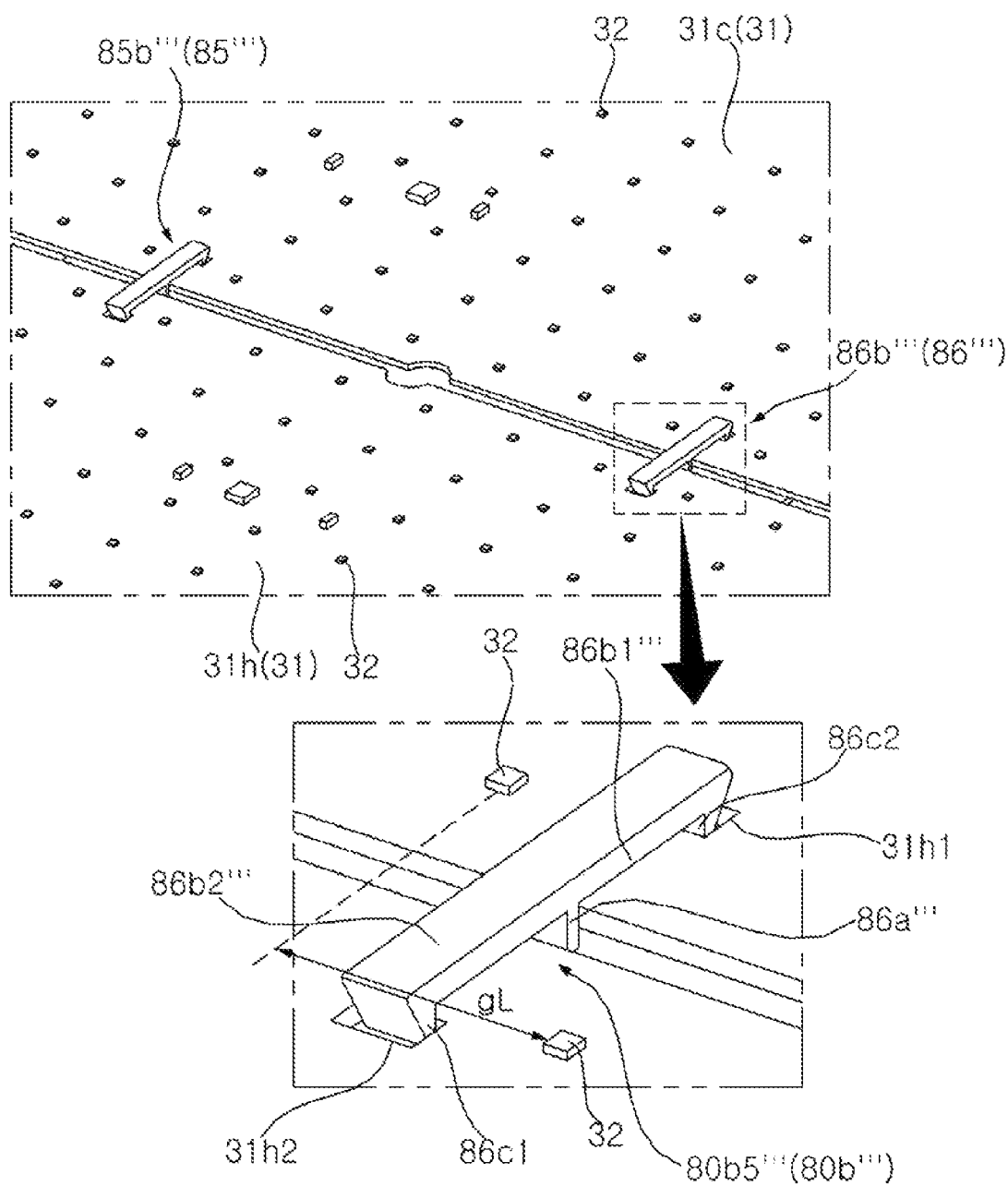

[FIG. 27]
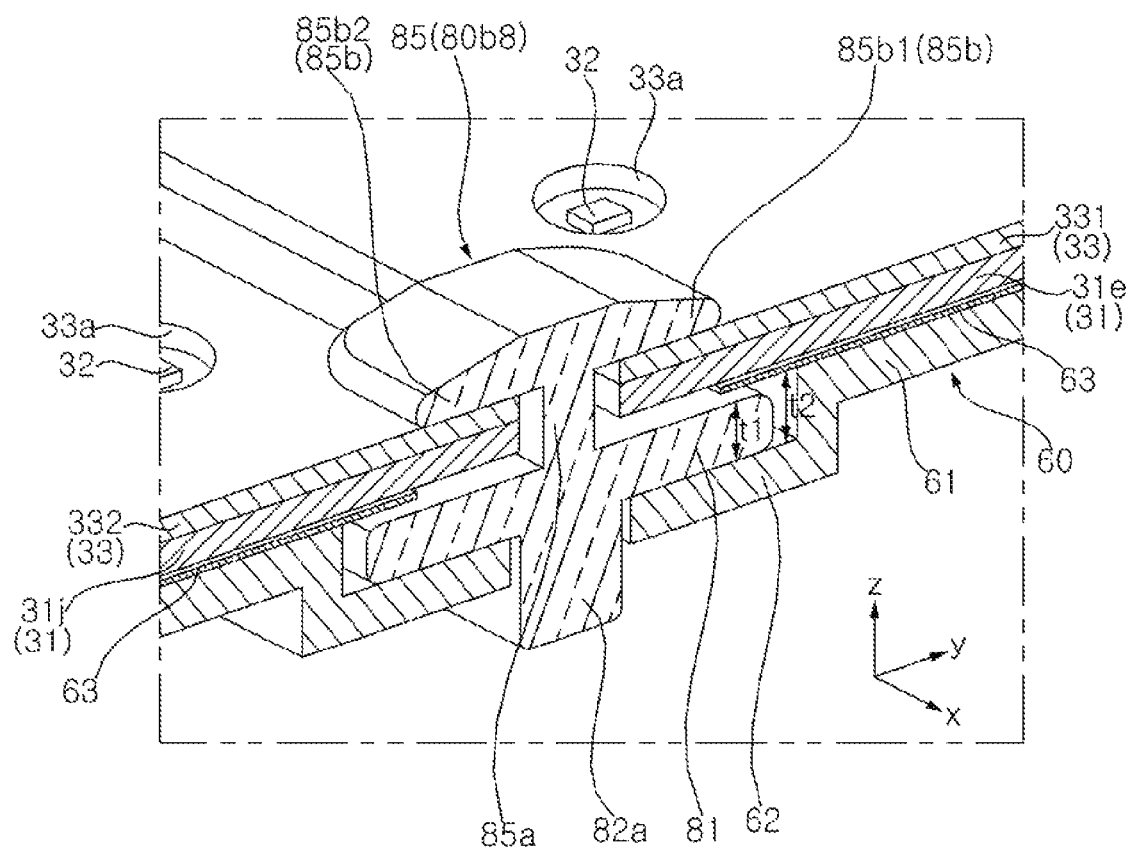

[FIG. 28]
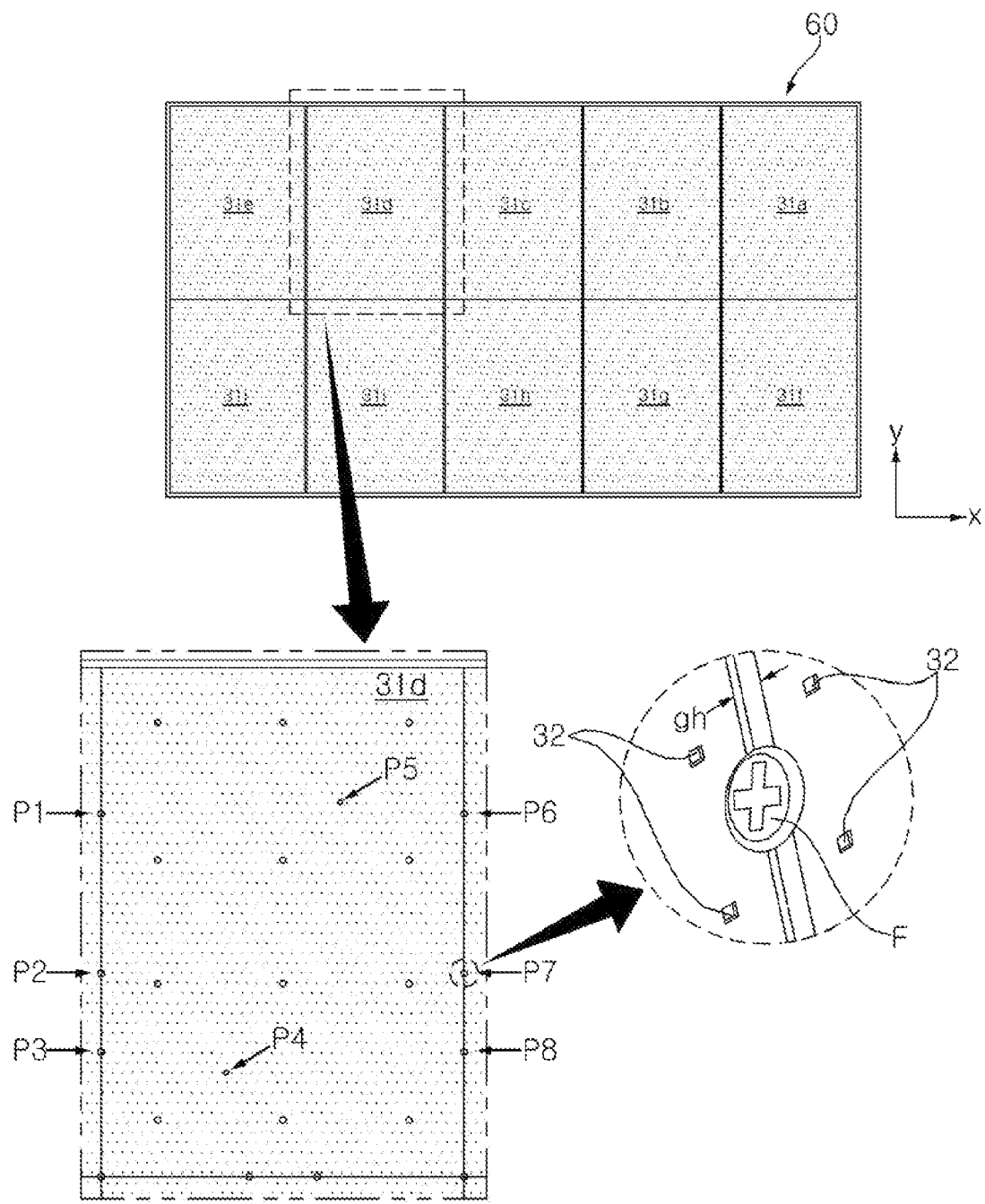

DISPLAY DEVICE

CROSS REFERENCE TO RELATED APPLICATIONS

This application is the National Phase of PCT International Application No. PCT/KR2022/000747, filed on Jan. 14, 2022, which claims priority under 35 U.S.C. 119(a) to Patent Application No. 10-2021-0022065, filed in the Republic of Korea on Feb. 18, 2021, all of which are hereby expressly incorporated by reference into the present application.

TECHNICAL FIELD

The present disclosure relates to a display device.

BACKGROUND ART

As the information society develops, the demand for display devices is also increasing in various forms. In response to this, various display devices such as Liquid Crystal Display Device (LCD), Plasma Display Panel (PDP), Electroluminescent Display (ELD), Vacuum Fluorescent Display (VFD), and Organic Light Emitting Diode (Organic Light Emitting Diode) have been researched and used in recent years.

Among these, a liquid crystal panel includes a TFT substrate and a color filter substrate facing each other with a liquid crystal layer interposed therebetween, and may display an image by using light provided from a backlight unit.

Recently, many studies have been conducted on a structure for fixing a substrate on which a light source such as an LED is mounted to a frame.

DISCLOSURE OF INVENTION

Technical Problem

An object of the present disclosure is to solve the above and other problems.

Another object may be to provide a structure for coupling a substrate to a frame.

Another object may be to provide a structure capable of reducing the number of adhesive members and/or fixing members for coupling a substrate to a frame.

Another object may be to provide various examples of the structure and shape of a supporter for coupling a substrate to a frame.

Solution to Problem

According to an aspect of the present disclosure for achieving the above object, a display device may include: a display panel; a frame located at a rear of the display panel; a substrate located between the display panel and the frame; a light source located on the substrate; and a supporter which is adjacent to one side of the substrate, which is coupled to the frame, and which has a groove into which the one side of the substrate is inserted, wherein the supporter may include: a body extending along the one side of the substrate, and located between the substrate and the frame; and a holder including a protruding portion that protrudes forward from a front surface of the body, and an extension portion that extends from a distal end of the protruding portion in a direction intersecting the body and the protruding portion, wherein the groove is formed between the extension portion and the body.

Advantageous Effects of Invention

The effect of the display device according to the present disclosure will be described as follows.

According to at least one of the embodiments of the present disclosure, a structure for coupling a substrate to a frame may be provided.

According to at least one of the embodiments of the present disclosure, a structure capable of reducing the number of adhesive members and/or fixing members for coupling a substrate to a frame may be provided.

According to at least one of the embodiments of the present disclosure, various examples of the structure and shape of a supporter for coupling a substrate to a frame may be provided.

Further scope of applicability of the present disclosure will become apparent from the following detailed description. However, it should be understood that the detailed description and specific embodiments such as preferred embodiments of the present disclosure are given by way of example only, since various changes and modifications within the spirit and scope of the present disclosure may be clearly understood by those skilled in the art.

BRIEF DESCRIPTION OF DRAWINGS

FIGS. 1 to 3 are diagrams illustrating examples of a display device related to the present disclosure.

FIGS. 4 to 28 are diagrams illustrating examples of a display device according to embodiments of the present disclosure.

MODE FOR INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the following description, even if the embodiment is described with reference to specific drawings, if necessary, reference numerals not appearing in the specific drawings may be referred to, and reference numerals not appearing in the specific drawings are used in a case where the above reference numerals appear in the other figures.

Referring to FIG. 1, a display device 1 may include a display panel 10. The display panel 10 may display a screen.

The display device 1 may include a first long side LS1, a second long side LS2 facing the first long side LS1, a first short side SS1 adjacent to the first long side LS1 and the second long side LS2, and a second short side SS2 facing the first short side SS1. In addition, for convenience of explanation, it is illustrated that the lengths of the first and second long sides LS1 and LS2 are longer than the lengths of the first and second short sides SS1 and SS2, but it may be possible that the lengths of the first and second long sides LS1 and LS2 are approximately the same as the lengths of the first and second short sides SS1 and SS2.

A direction parallel to the long side LS1, LS2 of the display device 1 may be referred to as a left-right direction. A direction parallel to the short side (SS1, SS2) of the display device 1 may be referred to as an up-down direction. A direction perpendicular to the long side LS1, LS2 and the short side SS1, SS2 of the display device 1 may be referred to as a front-rear direction.

A direction in which the display panel 10 displays an image may be referred to as front (F, z), and a direction opposite to this may be referred to as rear (R). The side of the first long side LS1 may be referred to as an upper side (U, y). The side of the second long side LS2 may be referred to as a lower side D. The side of the first short side SS1 may be referred to as a left side (Le, x). The side of the second short side SS2 may be referred to as a right side Ri.

In addition, the first long side LS1, the second long side LS2, the first short side SS1, and the second short side SS2 may be referred to as an edge of the display device 1. In addition, a point where the first long side LS1, the second long side LS2, the first short side SS1, and the second short side SS2 meet each other may be referred to as a corner.

For example, a point where the first short side SS1 and the first long side LS1 meet may be referred to as a first corner C1. A point where the first long side LS1 and the second short side SS2 meet may be referred to as a second corner C2. A point where the second short side SS2 and the second long side LS2 meet may be referred to as a third corner C3. A point where the second long side LS2 and the first short side SS1 meet may be referred to as a fourth corner C4.

Referring to FIG. 2, the display device 1 may include a display panel 10, a front cover 15, a guide panel 13, a backlight unit 20, a frame 60, and a back cover 70.

The display panel 10 may form the front surface of the display device 1, and display an image. The display panel 10 may display an image by having a plurality of pixels that output Red, Green, or Blue (RGB) color for each pixel according to a timing. The display panel 110 may be divided into an active area which displays an image and an de-active area which does not display an image. The display panel 110 may include a front substrate and a rear substrate facing each other with a liquid crystal layer interposed therebetween. The display panel 10 may be referred to as an LCD panel.

The front substrate may include a plurality of pixels including red, green, and blue sub-pixels. The front substrate may output light corresponding to a color of red, green, or blue according to a control signal.

The rear substrate may include switching elements. The rear substrate may switch a pixel electrode. For example, the pixel electrode may change the molecular arrangement of the liquid crystal layer according to an externally inputted control signal. The liquid crystal layer may include liquid crystal molecules. The arrangement of the liquid crystal molecules may be changed in response to a voltage difference generated between the pixel electrode and a common electrode. The liquid crystal layer may transmit light provided from the backlight unit 120 to the front substrate, or block the light.

The front cover 15 may cover at least a portion of the front and side surfaces of the display panel 10. The front cover 15 may be divided into a front cover located on the front surface of the display panel 10 and a side cover located on the side surface. The front cover and the side cover may be provided separately, or provided as one body. At least one of the front cover and the side cover may be omitted.

The guide panel 13 may surround the circumference of the display panel 10, and may cover a side surface of the display panel 10. The guide panel 13 may be coupled with the display panel 10 or support the display panel 10. The guide panel 13 may be referred to as a panel guide, a side frame, or a middle cabinet.

The backlight unit 20 may be located in the rear of the display panel 10. The backlight unit 20 may include light sources. The backlight unit 20 may be coupled to the frame 60 at the front of the frame 60. The backlight unit 20 may be driven by a full driving method, or a partial driving method such as local dimming, and impulsive. The backlight unit 20 may include an optical sheet 40 and an optical layer 30.

The optical sheet 40 may evenly transmit light from a light source to the display panel 10. The optical sheet 40 may be composed of a plurality of layers. For example, the optical sheet 40 may include a prism sheet or a diffusion sheet. Meanwhile, a coupling portion 40d of the optical sheet 40 may be coupled to the front cover 15, the frame 60, the back cover 70, or an inner guide 50 (see FIG. 5) described later.

The frame 60 may be located in the rear of the backlight unit 20, and may support components of the display device 1. For example, components such as the backlight unit 20 and a printed circuit board PCB on which a plurality of electronic devices are located may be coupled to the frame 60. The frame 60 may include a metal material such as aluminum alloy. The frame 60 may be referred to as a main frame or a module cover.

The back cover 70 may cover the rear of the frame 60. The back cover 70 may be coupled to the frame 60 and/or the front cover 15. For example, the back cover 70 may be an injection product made of resin. For another example, the back cover 70 may include a metal material.

Referring to FIG. 3, the optical layer 30 may include a substrate 31, at least one optical assembly 32, a reflective sheet 33, and a diffusion plate 35. The optical sheet 40 may be located in front of the optical layer 30.

The substrate 31 may be provided in the form of a plurality of straps that extend in the left-right direction and are spaced apart from each other in the up-down direction. At least one optical assembly 32 may be mounted on the substrate 31. An electrode pattern may be formed on the substrate 31 to connect an adapter and the optical assembly 32. For example, the electrode pattern may be a carbon nanotube electrode pattern. The substrate 31 may be made of at least one of polyethylene terephthalate PET, glass, polycarbonate PC, or silicon. The substrate 31 may be a printed circuit board PCB on which at least one optical assembly 32 is mounted.

The optical assembly 32 may be a light emitting diode (LED) chip or a light emitting diode package including at least one light emitting diode chip. The optical assembly 32 may be composed of a colored LED emitting at least one color among colors such as red, green, and blue, or a white LED. The colored LED may include at least one of a red LED, a green LED, and a blue LED. The optical assembly 32 may be referred to as a light source 32.

The reflective sheet 33 may be located in front of the substrate 31. At least one hole 33a may be formed by penetrating the reflective sheet 33, and the optical assembly 32 may be located in the hole 33a. The reflective sheet 33 may reflect light provided from the optical assembly 32 or reflected from the diffusion plate 35 in a forward direction. For example, the reflective sheet 33 may include a metal having a high reflectance such as at least one of aluminum Al, silver Ag, gold Au, or titanium dioxide TiO2 and/or a metal oxide.

In addition, an air gap may be formed between the reflective sheet 33 and the diffusion plate 35. The air gap may serve as a buffer, and light provided from the optical assembly 32 may be widely spread by the air gap. A spacer 34 may be located between the reflective sheet 33 and the diffusion plate 35, and may form the air gap.

The diffusion plate 35 may be located in front of the reflective sheet 33. The diffusion plate 35 may be located between the reflective sheet 33 and the optical sheet 40.

The optical sheet 40 may include at least one sheet. For example, the optical sheet 40 may include one or more prism sheets and/or one or more diffusion sheets. A plurality of sheets of the optical sheet 40 may be adhered to or in close contact with each other.

Specifically, the optical sheet 40 may be composed of a plurality of sheets having different functions. For example, the optical sheet 40 may include a first optical sheet 40a, a second optical sheet 40b, and a third optical sheet 40c. For example, the first optical sheet 40a may be a diffusion sheet, and the second optical sheet 40b and the third optical sheet 40c may be a prism sheet. The diffusion sheet prevents the light emitted from the diffusion plate 35 from being partially concentrated, thereby making the light distribution more uniform. The prism sheet may condense light emitted from the diffusion plate 35 and provide the light to the display panel 10. Meanwhile, the number and/or location of the diffusion sheet and the prism sheet may be changed.

Referring to FIG. 4, light sources 32 may be mounted on the front surface of the substrate 31, and provide light to the display panel 10. The light sources 32 may be operated by receiving power from a power device (not shown) through the substrate 31. For example, the display device 1 may include a plurality of substrates 31. For another example, the display device 1 may include a single substrate 31.

The reflective sheet 33 may be coupled to the front surface of the substrate 31, and may have holes. Each of the light sources 32 may be located in each of the holes of the reflective sheet 33. For example, the display device 1 may include a plurality of reflective sheets 33. For another example, the display device 1 may include a single reflective sheet 33.

The diffusion plate 35 may be spaced in a forward direction from the reflective sheet 33. The optical sheet 40 may be coupled to the front surface of the diffusion plate 35. The display panel 10 may be located in front of the optical sheet 40.

The guide panel 13 may be located between the substrate 31 and the frame 60. Alternatively, the guide panel 13 may be located between the display panel 10 and the optical sheet 40 (see FIG. 2). An insulation sheet 63 may be coupled to the front surface of the frame 60 and may be flat as a whole. Meanwhile, in some embodiments, the insulating sheet 63 may be omitted, and a heat dissipation plate may be disposed at a position of the insulating sheet 63. Alternatively, in some embodiments, both the insulating sheet 63 and the heat dissipation plate may be provided, or both may be omitted.

Referring to FIG. 5, the frame 60 may have a flat rectangular plate shape as a whole. The frame 60 may have a flat plate part 61.

A first adhesive member TP1 and a second adhesive member TP2 may be located between the upper side 60U and the lower side 60D of the frame 60, and may extend long in the up-down direction. The first adhesive member TP1 may be adjacent to the left side 60L of the frame 60 and may be coupled to the flat plate part 61. The second adhesive member TP2 may be adjacent to the right side 60R of the frame 60 and may be coupled to the flat plate part 61. For example, the first adhesive member TP1 and the second adhesive member TP2 may be a double-sided tape.

Referring to FIGS. 6 and 7, a supporter 80 may include a body 81, a first coupling portion 82, a second coupling portion 83, a protrusion 84, a first holder 85, and a second holder 86. For example, the supporter 80 may include a plastic material. For example, the above components of the supporter 80 may be formed as one body. Meanwhile, in some embodiments, instead of the first coupling portion 82 and the second coupling portion 83, a single coupling portion located in a central portion of the body 81 or in other area may be provided. Alternatively, in some embodiments, a single holder located in a central portion of the body 81 or in other area may be provided instead of the first holder 85 and the second holder 86.

The body 81 may be elongated in the left-right direction. A length L1 of the body 81 may be greater than a width w1 of the body 81. The width w1 of the body 81 may be greater than the thickness t1 of the body 81.

The first coupling portion 82 may be adjacent to one end of the body 81. The first coupling portion 82 may protrude rearward from the rear surface of the body 81. A length L2 of the first coupling portion 82 may be greater than the height h2a of the first coupling portion 82. A width w2 of the first coupling portion 82 may be smaller than the width w1 of the body 81. A first part 82a may protrude rearward from the rear surface of the body 81 and form the height h2a of the first coupling portion 82. A second part 82b may extend from the lower end of the first part 82a toward one end of the body 81, and may be parallel to the body 81. A third part 82c may protrude toward the body 81 from the distal end of the second part 82b, and may be spaced downward from the body 81 by a certain gap h2c. The first coupling portion 82 may be referred to as a first hook or a first foot.

The second coupling portion 83 may be adjacent to the other end of the body 81. The second coupling portion 83 may protrude rearward from the rear surface of the body 81. A length L3 of the second coupling portion 83 may be greater than the height h3a of the second coupling portion 83. The width of the second coupling portion 83 may be the same as the width w2 of the first coupling portion 82. A first part 83a may protrude rearward from the rear surface of the body 81, and form the height h3a of the second coupling portion 83. A second part 83b may extend from the lower end of the first part 83a toward one end of the body 81, and may be parallel to the body 81. A third part 83c may protrude toward the body 81 from the distal end of the second part 82b, and may be spaced downward from the body 81 by a certain gap h3c. The second coupling portion 83 may be referred to as a second hook or a second foot. For example, the second coupling portion 83 may have the same shape as the first coupling portion 82.

The protrusion 84 may be located between the first coupling portion 82 and the second coupling portion 83. The protrusion 84 may be located approximately in the central portion of the body 81. The protrusion 84 may protrude rearward from the rear surface of the body 81. The protrusion 84 may have a cylindrical shape. The diameter D4 of the protrusion 84 may be greater than the height h4 of the protrusion 84. The height h4 of the protrusion 84 may be smaller than the height h2a of the first coupling portion 82 and the height h3a of the second coupling portion 83.

The first holder 85 may be adjacent to one end of the body 81. The first holder 85 may opposite the first coupling portion 82 with respect to the body 81. The first holder 85 may protrude in a forward direction from the front surface of the body 81. A length L5 of the first holder 85 may be smaller than the length L2 of the first coupling portion 82. The width w5 of the first holder 85 may be greater than the width w2 of the first coupling portion 82. A first protruding portion 85a may be formed on the body 81. A first extension portion 85b may extend in the width direction of the first holder 85 from the distal end of the first protruding portion 85a, and may form the width w5 of the first holder 85. The first extension portion 85b may be spaced apart from the body 81 by the height of the first protruding portion 85a.

The second holder 86 may be adjacent to the other end of the body 81. The second holder 86 may opposite the second coupling portion 83 with respect to the body 81. The second holder 86 may protrude in the forward direction from the front surface of the body 81. A length L6 of the second holder 86 may be smaller than the length L3 of the second coupling portion 83. The width w6 of the second holder 86 may be greater than the width of the second coupling portion 83. A second protruding portion 86a may be formed on the body 81. A second extension portion 86b may extend in the width direction of the second holder 86 from the distal end of the second protruding portion 86a, and may form the width w6 of the second holder 86. The second extension portion 86b may be spaced apart from the body 81 by the height of the second protruding portion 86a.

Referring to FIGS. 7 and 8, a recessed portion 62 may be formed while being recessed rearward in the flat plate part 61 of the frame 60. The recessed portion 62 may extend long in the left-right direction. The depth t2 of the recessed portion 62 may be the same as or similar to the thickness t1 of the body 81 of the supporter 80. The width of the recessed portion 62 may be equal to or greater than the width w1 of the body 81 of the supporter 80. The length of the recessed portion 62 may be greater than the length L1 (see FIG. 6) of the body 81 of the supporter 80.

A first coupling hole 62a1, 62a2 may be formed by penetrating the recessed portion 62. A first slot 62a1 may be a long hole in the length direction of the recessed portion 62, and the length of the first slot 62a1 may be equal to or greater than the length L2 of the first coupling portion 82. A first hooking hole 62a2 may be spaced apart from the first slot 62a1 in the extending direction of the second part 82b of the first coupling portion 82. The gap between the first hooking hole 62a2 and the first slot 62a1 may be substantially the same as the gap between the first part 82a and the third part 82c of the first coupling portion 82. The size of the first hooking hole 62a2 may be smaller than the length of the first slot 62a1.

A second coupling hole 62b1, 62b2 may be formed by penetrating the recessed portion 62. A second slot 62b1 may be a long hole in the length direction of the recessed portion 62, and the length of the second slot 62b1 may be equal to or greater than the length L3 of the second coupling portion 83. A second hooking hole 62b2 may be spaced apart from the second slot 62b1 in the extending direction of the second part 83b of the second coupling portion 83. The gap between the second hooking hole 62b2 and the second slot 62b1 may be substantially the same as the gap between the first part 83a and the third part 83c of the second coupling portion 83. The size of the second hooking hole 62b2 may be smaller than the length of the second slot 62b1.

An insertion hole 62c may be formed by penetrating the recessed portion 62. The insertion hole 62c may be located between the first coupling hole 62a1, 62a2 and the second coupling hole 62b1, 62b2. The diameter of the insertion hole 62c may be equal to or larger than the diameter D4 of the protrusion 84.

Referring to FIGS. 8 to 10, the supporter 80 may be located in front of the recessed portion 62. In this case, the first coupling portion 82 may be aligned with the first slot 62a1, and the second coupling portion 83 may be aligned with the second slot 62b1.

In a state in which the coupling portion 82, 83 is inserted into the slot 62a1, 62b1 and the protrusion 84 is located on the recessed portion 62, the supporter 80 may slide in the extending direction of the second part 82, 83b of the coupling portion 82, 83.

According to the above sliding movement, the third part 82c of the first coupling portion 82 may be hooked to the first hooking hole 62a2, and the third part 83c of the second coupling portion 83 may be hooked to the second hooking hole 62b2. In addition, the second part 82b of the first coupling portion 82 may be hooked to the rear surface of the recessed portion 62 at between the first slot 62a1 and the first hooking hole 62a2, and the second part 82b of the second coupling portion 83 may be hooked to the rear surface of the recessed portion 62 at between the second slot 62b1 and the second hooking hole 62b2. In addition, the first part 82a of the first coupling portion 82 may be hooked to one end of the first slot 62a1, and the first part 83a of the second coupling portion 83 may be hooked to one end of the second slot 62b1. In addition, the protrusion 84 may be inserted into the insertion hole 62c.

Accordingly, the supporter 80 may be detachably coupled to the recessed portion 62 of the frame 60. The flow of the supporter 80 coupled to the recessed portion 62 may be restricted.

Referring to FIGS. 11 and 12, a supporter 80' may include a first stopper 87 and a second stopper 88.

The first stopper 87 may be located between the first coupling portion 82 and the protrusion 84, and may be adjacent to the first part 82a of the first coupling portion 82. The first stopper 87 may protrude rearward from the rear surface of the body 81, and may have a height h7 greater than the thickness of the recessed portion 62. The length of the aforementioned first slot 62a1 may be substantially equal to the sum of the gap between the first stopper 87 and the first part 82a of the first coupling portion 82, the thickness of the first stopper 87, and the thickness of the first part 82a.

The second stopper 88 may opposite the protrusion 84 with respect to the second coupling portion 83, and may be adjacent to the first part 83a of the second coupling portion 83. The second stopper 88 may protrude rearward from the rear surface of the body 81, and may have a height h8 greater than the thickness of the recessed portion 62. The length of the aforementioned second slot 62b1 may be substantially equal to the sum of the gap between the second stopper 88 and the first part 83a of the second coupling portion 83, the thickness of the second stopper 88, and the thickness of the first part 83a.

Accordingly, when the supporter 80 is coupled to the recessed portion 62 of the frame 60, the first stopper 87 may be inserted into the first slot 62a1 and hooked to the other end of the first slot 62a1, and the second stopper 88 may be inserted into the second slot 62b1 and hooked to the other end of the second slot 62b1. That is, the coupling between the supporter 80 and the recessed portion 62 may be more stably maintained by the first stopper 87 and the second stopper 88.

Meanwhile, a length L5' of a first holder 85' including a first protruding portion 85a' and a first extension portion 85b' may be greater than the length L2 of the first coupling portion 82. In addition, a length L6' of a second holder 86' including a second protruding portion 86a' and a second extension portion 86b' may be greater than a length L3 of the second coupling portion 83.

Referring to FIG. 13, a supporter 80" may include a first coupling portion 82" and a second coupling portion 83".

The first coupling portion 82" may be adjacent to one end of the body 81. A first part 82a" may protrude rearward from the rear surface of the body 81. A second part 82b1 may be curved toward the body 81 from the lower end of the first part 82a", and may be spaced apart from the side surface of the first part 82a". A third part 82c1 may protrude toward the body 81 from the distal end of the second part 82b1, and may be spaced downward from the body 81 by a certain gap. A fourth part 82b2 may be curved toward the body 81 from the lower end of the first part 82a", and may opposite the second part 82b1 with respect to the first part 82a". The second part 82b1 and the fourth part 82b2 may have a U shape as a whole in the length direction of the body 81. A fifth part 82c2 may protrude toward the body 81 from the distal end of the fourth part 82b2, and may be spaced downward from the body 81 by a certain gap.

In this case, a first step may be formed between the second part 82b1 and the third part 82c1, and the first step may be formed in the outside of the third part 82c1. In addition, a second step may be formed between the fourth part 82b2 and the fifth part 82c2, and the second step may be formed in the outside of the fifth part 82c2.

The second coupling portion 83" may be adjacent to the other end of the body 81. A first part 83a" may protrude rearward from the rear surface of the body 81. A second part 83b1 may be curved toward the body 81 from the lower end of the first part 83a", and may be spaced apart from the side surface of the first part 83a". A third part 83c1 may protrude toward the body 81 from the distal end of the second part 83b1, and may be spaced downward from the body 81 by a certain gap. A fourth part 83b2 may be curved toward the body 81 from the lower end of the first part 83a", and may opposite the second part 83b1 with respect to the first part 83a. The second part 83b1 and the fourth part 83b2 may have a U shape as a whole in the length direction of the body 81. A fifth part 83c2 may protrude toward the body 81 from the distal end of the fourth part 83b2, and may be spaced downward from the body 81 by a certain gap.

In this case, a first step may be formed between the second part 83b1 and the third part 83c1, and the first step may be formed in the outside of the third part 83c1. In addition, a second step may be formed between the fourth part 83b2 and the fifth part 83c2, and the second step may be formed in the outside of the fifth part 83c2. For example, the second coupling portion 83" may have the same shape as the first coupling portion 82".

A first coupling hole (not shown) may be formed in the recessed portion 62 instead of the first coupling hole 62a1, 62a2 described above with reference to FIG. 8. The first coupling hole may be a long hole in the length direction of the recessed portion 62, and the length of the first coupling hole may be smaller than the maximum width of the second part 82b1 and the fourth part 82b2.

A second coupling hole (not shown) may be formed in the recessed portion 62 instead of the second coupling hole 62b1, 62b2 described above with reference to FIG. 8. The second coupling hole may be a long hole in the length direction of the recessed portion 62, and the length of the second coupling hole may be smaller than the maximum width of the second part 83b1 and the fourth part 83b2.

In this case, the second part 82b1 and the fourth part 82b2 of the first coupling portion 82" may be inserted into the first coupling hole while a gap between them is reduced, the first step and the second step of the first coupling portion 82" may be hooked to the rear surface of the recessed portion 62, and the third part 82c1 and the fifth part 82c2 may be hooked to one end and the other end of the first coupling hole. In addition, the second part 83b1 and the fourth part 83b2 of the second coupling portion 83" may be inserted into the second coupling hole while a gap between them is reduced, the first step and the second step of the second coupling portion 83" may be hooked to the rear surface of the recessed portion 62, and the third part 83c1 and the fifth part 85c2 may be hooked to one end and the other end of the second coupling hole.

Accordingly, the supporter 80" may be detachably coupled to the recessed portion 62 of the frame 60. The flow of the supporter 80" coupled to the recessed portion 62 may be restricted.

Referring to FIGS. 5 and 14, a plurality of supporters 80 may be coupled to the frame 60. A plurality of first supporters 80a may be spaced apart from each other in the left-right direction, and may be adjacent to the upper side 60U of the frame 60 (see area A of FIG. 5). A plurality of second supporters 80b may be spaced apart from each other in the left-right direction, and may be located in or adjacent to a horizontal line H passing through the center of the frame 60 (see area B of FIG. 5). A plurality of third supporters 80c may be spaced apart from each other in the left-right direction, and may be adjacent to the lower side 60D of the frame 60 (see area C of FIG. 5). For example, in the up-down direction, the first supporters 80a, the second supporters 80b, and the third supporters 80c may be aligned with each other.

The insulating sheet 63 may be located between the first adhesive member TP1 and the second adhesive member TP2, and may be coupled to the front surface of the flat plate part 61 of the frame 60. For example, the insulating sheet 63 may include a first insulating sheet 63a and a second insulating sheet 63b. A dividing line between the first insulating sheet 63a and the second insulating sheet 63b may be located in or adjacent to a vertical line V passing through the center of the frame 60.

For example, the insulating sheet 63 may be located between the plurality of first supporters 80a and the plurality of third supporters 80c. The plurality of first supporters 80a and the plurality of third supporters 80c may be located beyond the insulating sheet 63, and the plurality of second supporters 80b may be located in the insulating sheet 63. The holder (85, 86, see FIGS. 7 and 13; 85', 86', see FIG. 11) of each of the plurality of second supporters 80b may penetrate the insulation sheet 63.

For another example, the insulating sheet 63 may be located between the upper side 60U and the lower side 60D of the frame 60. The plurality of first supporters 80a, the plurality of second supporters 80b, and the plurality of third supporters 80c may be located in the insulating sheet 63. The holder (85, 86, see FIGS. 7 and 13; 85', 86', see FIG. 11) of each of the plurality of first supporters 80a, the plurality of second supporters 80b, and the plurality of third supporters 80c may penetrate the insulating sheet 63.

Referring to FIG. 15, the substrate 31 may be located in front of the insulating sheet 63 and may be coupled to the frame 60. The substrate 31 may cover the insulating sheet 63 and the front surface of the frame 60. One part of the rear surface of the substrate 31 may be coupled or attached to the first adhesive member TP1, and the other part may be coupled or attached to the second adhesive member TP2.

For example, the substrate 31 may include a plurality of substrates (31a, 31b, 31c, 31d, 31e, 31f, 31g, 31h, 31i, 31j, see FIG. 20) that have a rectangular plate shape and are adjacent to each other. A first substrate 31a, a second substrate 31b, a third substrate 31c, a fourth substrate 31d, and a fifth substrate 31e may be adjacent to the upper side 60U of the frame 60. A sixth substrate 31f, a seventh substrate 31g, a eighth substrate 31h, a ninth substrate 31i, and a tenth substrate 31j may be adjacent to the lower side 60D of the frame 60. The first substrate 31a and the sixth substrate 31f may be attached to the first adhesive member TP1. The fifth substrate 31e and the tenth substrate 31j may be attached to the second adhesive member TP2.

Referring to FIGS. 16 and 17, the plurality of substrates 31 may be spaced apart from each other. In the horizontal direction, the plurality of substrates 31 may be spaced apart from each other by a certain gap gh. In the up-down direction, the plurality of substrates 31 may be spaced apart from each other by a certain gap gv. These gaps gh and gv may be a gap considering thermal expansion of the plurality of substrates 31. A plurality of light sources 32 may be located on a plurality of substrates 31.

In the up-down direction, a second supporter 80b8 may be located between substrates 31 adjacent to each other. Specifically, the first holder 85 of the second supporter 80b8 may penetrate the second insulating sheet 63b, and may be located in the gap gv between the fifth substrate 31e and the tenth substrate 31j. Further, the second holder 86 of the second supporter 80b8 may penetrate the second insulating sheet 63b, and may be located in the gap gv between the fourth substrate 31d and the ninth substrate 31i (see FIG. 20).

The first extension portion 85b of the first holder 85 of the second supporter 80b8 may include an upper portion 85b1 and a lower portion 85b2. The upper portion 85b1 may be in contact with or adjacent to the front surface of the fifth substrate 31e located in the upper side of the first protruding portion 85a of the first holder 85 of the second supporter 80b. The lower portion 85b2 may be in contact with or adjacent to the front surface of the tenth substrate 31j located in the lower side of the first protruding portion 85a of the first holder 85 of the second supporter 80b8.

Accordingly, the fifth substrate 31e and the tenth substrate 31j may be hooked to the first extension portion 85b of the first holder 85 of the second supporter 80b8. In other words, the lower side of the fifth substrate 31e may be inserted into the groove between the body 81 and the upper portion 85b1, and the upper side of the tenth substrate 31j may be inserted into the groove between the body 81 and the lower portion 85b2. Similarly, the fourth substrate 31d and the ninth substrate 31i (see FIG. 20) may be hooked to the second extension portion 86b of the second holder 86 of the second supporter 80b8.

The above description of the second supporter 80b8 may be identically applied to the other second supporters 80b1, 80b2, 80b3, 80b4, 80b5, 80b6, 80b7, and 80b9 (see FIG. 14). In addition, the above description of the second supporter 80b8 may be identically applied to the plurality of first supporters 80a1, 80a2, 80a3, 80a4, 80a5, 80a6, 80a7, 80a8, and 80a9 (see FIG. 14) and the plurality of third supporters 80c1, 80c2, 80c3, 80c4, 80c5, 80c6, 80c7, 80c8, and 80c9 (see FIG. 14).

Referring to FIG. 18, each of a plurality of substrates 31' may include a vertical plate 311 and horizontal plates 312. The vertical plate 311 may extend in a vertical direction. A plurality of horizontal plates 312 may extend in a horizontal direction from one long side of the vertical plate 311, and may be spaced apart from each other in the vertical direction. The substrate 31' may have a fork shape as a whole.

The plurality of substrates 31' may be spaced apart from each other. In the horizontal direction, the plurality of substrates 31' may be spaced apart from each other by a certain gap. In the vertical direction, the plurality of substrates 31' may be spaced apart from each other by a certain gap. This gap may be a gap considering thermal expansion of the plurality of substrates 31'. The plurality of light sources 32 may be located on the vertical plate 311 and the plurality of horizontal plates 312.

In the vertical direction, the second supporter 80b2 may be located between adjacent substrates 31'. Specifically, the first holder 85 of the second supporter 80b2 may be located in the gap between the second substrate 31b' and the seventh substrate 31g'. In addition, the second holder 86 of the second supporter 80b2 may be located in a gap between the first substrate 31a' and the sixth substrate 31f.

The first extension portion 85b of the first holder 85 of the second supporter 80b2 may include an upper portion 85b1 and a lower portion 85b2. The upper portion 85b1 may be in contact with or adjacent to the front surface of the lowermost horizontal plate 312 of the second substrate 31b'. The lower portion 85b2 may be in contact with or adjacent to the front surface of the uppermost horizontal plate 312 of the seventh substrate 31g'.

Accordingly, the second substrate 31b' and the seventh substrate 31g' may be hooked to the first extension portion 85b of the first holder 85 of the second supporter 80b2.

The second extension portion 86b of the second holder 86 of the second supporter 80b2 may include an upper portion 86b1 and a lower portion 86b2. The upper portion 86b1 may be in contact with or adjacent to the front surface of the lowermost horizontal plate 312 of the first substrate 31a'. The lower portion 86b2 may be in contact with or adjacent to the front surface of the uppermost horizontal plate 312 of the sixth substrate 31f.

Accordingly, the first substrate 31a' and the sixth substrate 31f may be hooked to the second extension portion 86b of the second holder 86 of the second supporter 80b2.

The above description of the supporter 80b2 may be identically applied to the other second supporters 80b1, 80b3, 80b4, 80b5, 80b6, 80b7, 80b8, and 80b9 (see FIG. 14). In addition, the above description of the second supporter 80b2 may be identically applied to the plurality of first supporters 80a1, 80a2, 80a3, 80a4, 80a5, 80a6, 80a7, 80a8, and 80a9 (see FIG. 14) and the plurality of third supporters 80c1, 80c2, 80c3, 80c4, 80c5, 80c6, 80c7, 80c8, and 80c9 (see FIG. 14).

Referring to FIG. 19, each of the plurality of substrates 31" may include straps 313 that are long in the horizontal direction. The straps 313 may be spaced apart from each other in the vertical direction. The strap 313 may be referred to as a horizontal plate or bar.

The plurality of substrates 31" may be spaced apart from each other. In the horizontal direction, the plurality of substrates 31" may be spaced apart from each other by a certain gap. In the vertical direction, the plurality of substrates 31" may be spaced apart from each other by a certain gap. This gap may be a gap considering thermal expansion of the plurality of substrates 31". A plurality of light sources 32 may be located on the straps 313.

In the vertical direction, the second supporter 80b2 may be located between adjacent substrates 31". Specifically, the first holder 85 of the second supporter 80b2 may be located in a gap between the second substrate 31b" and the seventh substrate 31g". In addition, the second holder 86 of the second supporter 80b2 may be located in a gap between the first substrate 31a" and the sixth substrate 31r.

The first extension portion 85b of the first holder 85 of the second supporter 80b2 may include an upper portion 85b1 and a lower portion 85b2. The upper portion 85b1 may be in contact with or adjacent to the front surface of the lowermost strap 313 of the second substrate 31b". The lower portion 85b2 may be in contact with or adjacent to the front surface of the uppermost strap 313 of the seventh substrate 31g".

Accordingly, the second substrate 31b" and the seventh substrate 31g" may be hooked to the first extension portion 85b of the first holder 85 of the second supporter 80b2.

The second extension portion 86b of the second holder 86 of the second supporter 80b2 may include an upper portion 86b1 and a lower portion 86b2. The upper portion 86b1 may be in contact with or adjacent to the front surface of the lowermost strap 313 of the first substrate 31a0". The lower portion 86b2 may be in contact with or adjacent to the front surface of the uppermost strap 313 of the sixth substrate 31f".

Accordingly, the first substrate 31a" and the sixth substrate 31f may be hooked to the second extension portion 86b of the second holder 86 of the second supporter 80b2.

The above description of the supporter 80b2 may be identically applied to the other second supporters 80b1, 80b3, 80b4, 80b5, 80b6, 80b7, 80b8, and 80b9 (see FIG. 14). In addition, the above description of the second supporter 80b2 may be identically applied to the plurality of first supporters 80a1, 80a2, 80a3, 80a4, 80a5, 80a6, 80a7, 80a8, and 80a9 (see FIG. 14) and the plurality of third supporters 80c1, 80c2, 80c3, 80c4, 80c5, 80c6, 80c7, 80c8, and 80c9 (see FIG. 14).

Referring to FIG. 20, the plurality of first supporters 80a may be coupled to upper side of the first to fifth substrates 31a, 31b, 31c, 31d, and 31e. A first-first supporter 80a1 may be coupled to the central portion of the upper side of the first substrate 31a. A first-second supporter 80a2 may be coupled to upper sides of the first and second substrates 31a and 31b. A first-third supporter 80a3 may be coupled to the central portion of the upper side of the second substrate 31b. A first-fourth supporter 80a4 may be coupled to upper sides of the second and third substrates 31b and 31c. A first-fifth supporter 80a5 may be coupled to the central portion of the upper side of the third substrate 31c. A first-sixth supporter 80a6 may be coupled to the upper sides of the third and fourth substrates 31c and 31d. A first-seventh supporter 80a7 may be coupled to the central portion of the upper side of the fourth substrate 31d. A first-eighth supporter 80a8 may be coupled to the upper sides of the fourth and fifth substrates 31d and 31e. A first-ninth supporter 80a9 may be coupled to the central portion of the upper side of the fifth substrate 31e.

The plurality of second supporters 80b may be coupled to the lower side of the first to fifth substrates 31a, 31b, 31c, 31d, and 31e and the upper side of the sixth to tenth substrates 31f, 31g, 31h, 31i, and 31j. A second-first supporter 80b1 may be coupled to the central portion of the lower side of the first substrate 31a and the central portion of the upper side of the sixth substrate 31f. A second-second supporter 80b2 may be coupled to the first substrate 31a, the second substrate 31b, the sixth substrate 31f, and the seventh substrate 31g. A second-third supporter 80b3 may be coupled to the central portion of the lower side of the second substrate 31b and the central portion of the upper side of the seventh substrate 31g. A second-fourth supporter 80b4 may be coupled to the second substrate 31b, the third substrate 31c, the seventh substrate 31g, and the eighth substrate 31h. A second-fifth supporter 80b5 may be coupled to the central portion of the lower side of the third substrate 31c and the central portion of the upper side of the eighth substrate 31h. A second-sixth supporters 80b6 may be coupled to the third substrate 31c, the fourth substrate 31d, the eighth substrate 31h, and the ninth substrate 31i. A second-seventh supporter 80b7 may be coupled to the central portion of the lower side of the fourth substrate 31d and the central portion of the upper side of the ninth substrate 31i. A second-eighth supporters 80b8 may be coupled to the fourth substrate 31d, the fifth substrate 31e, the ninth substrate 31i, and the tenth substrate 31j. A second-ninth supporters 80b9 may be coupled to the central portion of the lower side of the fifth substrate 31e and the central portion of the upper side of the tenth substrate 31j.

The plurality of third supporters 80c may be coupled to lower sides of the sixth to tenth substrates 31f, 31g, 31h, 31i, and 31j. A third-first supporter 80c1 may be coupled to the central portion of the lower side of the sixth substrate 31f. A third-second supporter 80c2 may be coupled to lower sides of the sixth and seventh substrates 31f and 31g. A third-third supporter 80c3 may be coupled to the central portion of the lower side of the seventh substrate 31g. A third-fourth supporter 80c4 may be coupled to lower sides of the seventh and eighth substrates 31g and 31h. A third-fifth supporter 80c5 may be coupled to the central portion of the lower side of the eighth substrate 31h. A third-sixth supporter 80c6 may be coupled to the lower sides of the eighth and ninth substrates 31h and 31i. A third-seventh supporter 80c7 may be coupled to the central portion of the lower side of the ninth substrate 31i. A third-eighth supporter 80c8 may be coupled to lower sides of the ninth and tenth substrates 31i and 31j. A third-ninth supporter 80c9 may be coupled to the central portion of the lower side of the tenth substrate 31j.

Referring to FIGS. 20 and 21, the first holder 85 of the first supporter 80a may include a lower portion 85b2. The lower portion 85b2 may extend downward from the front end of the protruding portion 85a. The lower portion 85b2 may be in contact with or adjacent to the front surface of the substrate 31 located in the lower side of the protruding portion 85a. The second holder 86 of the first supporter 80a may include a lower portion 86b2. The lower portion 86b2 may extend downward from the front end of a protruding portion (no reference numeral). The lower portion 86b2 may be in contact with or adjacent to the front surface of the substrate 31 located in the lower side of the first protruding portion.

Accordingly, the substrates 31a, 31b, 31c, 31d, and 31e may be hooked to the lower portion 85b2, 86b2 of the first supporter 80a. Meanwhile, the lower portion 85b2, 86b2 may be located between the light sources 32, and may have a length smaller than the gap gL between the light sources 32.

Referring to FIGS. 20 and 22, the first holder 85 of the second supporter 80b may include an upper portion 85b1 and a lower portion 85b2. The upper portion 85b1 may extend upward from the front end of the protruding portion 85a. The upper portion 85b1 may be in contact with or adjacent to the front surface of the substrate 31 located in the upper side of the protruding portion 85a. The lower portion 85b2 may extend downward from the front end of the protruding portion 85a. The lower portion 85b2 may be in contact with or adjacent to the front surface of the substrate 31 located in the lower side of the protruding portion 85a. The second holder 86 of the second supporter 80b may have the same shape as the first holder 85.

Accordingly, the substrates 31a, 31b, 31c, 31d, 31e, 31f, 31g, 31h, 31i, and 31j may be hooked to the first holder 85 and the second holder 86 of the second supporter 80b. Meanwhile, the first holder 85 and the second holder 86 may be located between the light sources 32, and may have a length smaller than the gap gL between the light sources 32.

Referring to FIGS. 20 and 23, the first holder 85 of the third supporter 80c may include the upper portion 85b1. The upper portion 85b1 may extend upward from the front end of a protruding portion (no reference numeral). The upper portion 85b1 may be in contact with or adjacent to the front surface of the substrate 31 located in the upper side of the protruding portion. The second holder 86 of the third supporter 80c may include the upper portion 86b1. The upper portion 86b1 may extend upward from the front end of the protruding portion 86a. The upper portion 86b1 may be in contact with or adjacent to the front surface of the substrate 31 located in the upper side of the protruding portion 86a.

Accordingly, the substrates 31f, 31g, 31h, 31i, and 31j may be hooked to the upper portion 85b1, 86b1 of the third supporter 80c. Meanwhile, the upper portion 85b1, 86b1 may be located between the light sources 32, and may have a length smaller than the gap gL between the light sources 32.

Referring to FIG. 24, the second holder 86' of the second supporter 80b' may include an upper portion 86b1' and a lower portion 86b2'. The upper portion 86b1' may extend upward from the front end of the protruding portion 86a'. The upper portion 86b1' may be in contact with or adjacent to the front surface of the substrate 31 located in the upper side of the protruding portion 86a'. The lower portion 86b2' may extend downward from the front end of the protruding portion 86a'. The lower portion 86b2' may be in contact with or adjacent to the front surface of the substrate 31 located in the lower side of the protruding portion 86a'. The first holder 85' of the second supporter 80b' may have the same shape as the second holder 86'.

Accordingly, the substrates 31a, 31b, 31c, 31d, 31e, 31f, 31g, 31h, 31i, and 31j may be hooked to the first holder 85' and the second holder 86' of the second supporter 80b'. Meanwhile, the first holder 85' and the second holder 86' may be located between the light sources 32. In addition, the length L5' (see FIG. 11) of the first holder 85' and the length L6' of the second holder 86' may be equal to or similar to the gap gL between the light sources 32. That is, the coupling stability of the substrates and holders may be improved.

The lower portion 85b2, 86b2 (see FIG. 21) of the first supporter 80a described above may be deformed to have the length L6' of the second holder 86'. The upper portion 85b1, 86b1 (see FIG. 23) of the third supporter 80c described above may be deformed to have the length L6' of the second holder 86'.

Referring to FIGS. 25 and 26, a second supporter 80b''' may include a first holder 85'' and a second holder 86''. For example, the second supporter 80b''' may include the body 81, the first coupling portion 82, the second coupling portion 83, and the protrusion 84 described above with reference to FIG. 7. For another example, the second supporter 80b''' may include the body 81, the first coupling portion 82, the second coupling portion 83, the protrusion 84, the stopper 87, and the second stopper 88 described above with reference to FIG. 11. For another example, the second supporter 80b''' may include the body 81, the first coupling portion 82'', the second coupling portion 83'', and the protrusion 84 described above with reference to FIG. 13.

The first holder 85'' may be adjacent to one end of the body 81. The first holder 85''' may protrude forward from the front surface of the body 81. The width w50 of the first holder 85''' may be greater than the width w1 of the body 81. The first protruding portion 85a''' may be formed on the body 81. A first extension portion 85b''' may extend from the distal end of the first protruding portion 85a''' in the width direction of the first holder 85'', and may form the width W50 of the first holder 85''. The first extension portion 85b''' may be spaced apart from the body 81 by a height of the first protruding portion 85a'''.

The first extension portion 85b''' may include an upper portion 85b1''' and a lower portion 85b2''. The upper portion 85b1''' may extend upward from the distal end of the first protruding portion 85a'''. An upper hooking portion 85c2 may protrude in a rearward direction from the distal end of the upper portion 85b1'''. The lower portion 85b2'''' may extend downward from the distal end of the first protruding portion 85a'''. A lower hooking portion 85c1 may protrude rearward from the distal end of the lower portion 85b2''. The upper hooking portion 85c2 and the lower hooking portion 85c1 may have a hook shape.

The second holder 86'' may be adjacent to the other end of the body 81. The second holder 86''' may protrude forward from the front surface of the body 81. The width w60 of the second holder 86''' may be greater than the width w1 of the body 81. The second protruding portion 86a''' may be formed on the body 81. The second extension portion 86b''' may extend from the distal end of the second protruding portion 86a'' in the width direction of the second holder 86'', and may form the width w60 of the second holder 86''. The second extension portion 86b''' may be spaced apart from the body 81 by a height of the second protruding portion 86a'''.

The second extension portion 86b''' may include an upper portion 86b1''' and a lower portion 86b2''. The upper portion 86b1''' may extend upward from the distal end of the second protruding portion 86a'''. An upper hooking portion 86c2 may protrude rearward from the distal end of the upper portion 86b1'''. The lower portion 86b2''' may extend downward from the distal end of the second protruding portion 86a'''. A lower hooking portion 86c1 may protrude rearward from the distal end of the lower portion 86b2''. The upper hooking portion 86c2 and the lower hooking portion 86c1 may have a hook shape.

For example, the first holder 85' and the second holder 86'' may have the same shape.

The upper hooking portion 85c2, 86c2 of the second supporter 80b''' may be hooked to the substrate 31 located in the upper side of the protruding portion 85a''', 86a''. The substrate 31 may have a hole or a groove to which the upper hooking portion 85c2, 86c2 is hooked (see reference numeral 31h1 in FIG. 26). The lower hooking portion 85c1, 86c1 of the second supporter 80b''' may be hooked to the substrate 31 located in the lower side of the protruding portion 85a'', 86a'''. The substrate 31 may have a hole or a groove to which the lower hooking portion 85c1, 86c1 is hooked (see reference numeral 31h2 in FIG. 26).

Accordingly, the substrates 31a, 31b, 31c, 31d, 31e, 31f, 31g, 31h, 31i, and 31j may be hooked to the first holder 85''' and the second holder 86b''' of the second supporter 80b'''. At this time, the holders may stably hold the flow of the substrates. That is, the coupling stability of the substrates and the holders may be further improved.

The first holder 85 (see FIG. 21) of the first supporter 80a described above may be deformed into the shape of the first holder 85''' from which the upper portion 85b1''' is removed, and the second holder 86 (see FIG. 21) of the first supporter 80a may be deformed into the shape of the second holder 86'' from which the upper portion 86b1''' is removed.

The first holder 85 (see FIG. 23) of the third supporter 80c may be deformed into the shape of the first holder 85'' from which the lower portion 85b2''' is removed, and the second holder 86 (see FIG. 23) of the third supporter 80c may be deformed into the shape of the second holder 86'' from which the lower portion 86b2'' is removed.

Referring to FIG. 27, the reflective sheet 33 may be located in front of the substrate 31. For example, the plurality of reflective sheets 33 may be spaced apart from each other at regular intervals. The light source 32 may be located in a hole 33a formed in the reflective sheet 33.

The protruding portion 85a may penetrate the substrate 31 and the reflective sheet 33. The extension portion 85b may be in contact with or adjacent to the front surface of the reflective sheet 33. The extension portion 85b may press the reflective sheet 33 toward the substrate 31. Accordingly, the supporter may be coupled to the reflective sheet 33 and the substrate 31.

Referring to FIG. 28, a fixing member F may penetrate the plurality of substrates 31a, 31b, 31c, 31d, 31e, 31f, 31g, 31h, 31i, and 31j, and be coupled to the frame 60. For example, the fixing member F may be a screw.

For example, the fixing members F may be located at eight points based on the fourth substrate 31d. First to third points P1, P2, and P3 may be located in a boundary between the fourth substrate 31d and the fifth substrate 31e. At the first to third points P1, P2, and P3, the head of the fixing member F may be located on the fourth substrate 31d and the fifth substrate 31e. The fourth and fifth points P4 and P5 may be located on the fourth substrate 31d. At the fourth and fifth points P4 and P5, the head of the fixing member F may be located on the fourth substrate 31d. The sixth to eighth points P6, P7, and P8 may be located in a boundary between the fourth substrate 31d and the third substrate 31c. At the sixth to eighth points P6, P7, and P8, the head of the fixing member F may be located on the fourth substrate 31d and the third substrate 31c.

As described above with reference to FIG. 20 and the like, the upper and lower sides of each of the plurality of substrates 31a, 31b, 31c, 31d, 31e, 31f, 31g, 31h, 31i, and 31j may be coupled to the plurality of supporters 80. In this case, the necessity of coupling the upper and lower sides of each of the plurality of substrates 31a, 31b, 31c, 31d, 31e, 31f, 31g, 31h, 31i, and 31j to the fixing member F may be low. In other words, the number of fixing members F may be reduced through the coupling of the substrates and the supporters. Similarly, unlike the above-described first and second adhesive members TP1 and TP2 (see FIG. 14), the necessity of providing an adhesive member adjacent to the upper and lower sides of the frame 60 may be low. In other words, the number of adhesive members may be reduced through the coupling of the substrates and the supporters.

Referring to FIGS. 1 to 28, a display device according to an aspect of the present disclosure may include: a display panel; a frame located at a rear of the display panel; a substrate located between the display panel and the frame; a light source located on the substrate; and a supporter which is adjacent to one side of the substrate, which coupled to the frame, and which has a groove into which the one side of the substrate is inserted, wherein the supporter may include: a body extending along the one side of the substrate, and located between the substrate and the frame; and a holder including a protruding portion that protrudes forward from a front surface of the body, and an extension portion that extends from a distal end of the protruding portion in a direction intersecting the body and the protruding portion, wherein the groove is formed between the extension portion and the body.

The holder may include: a first holder adjacent to one end of the body; and a second holder adjacent to the other end of the body.

The extension portion may have a length in a length direction of the body, and may be in contact with a front surface of the substrate.

The extension portion may further include a hooking portion which protrudes toward the substrate from a distal end of the extension portion, and the substrate may further include a hole or a groove which is formed at a front surface of the substrate, and to which the hooking portion is hooked.

The substrate may include a plurality of substrates which are adjacent to each other while being spaced apart from each other, and the supporter may be located between the plurality of substrates in a direction intersecting a length direction of the body.

The plurality of substrates may include: a first substrate adjacent to an upper side of the frame; and a second substrate adjacent to a lower side of the frame, and the supporter may further include: a first supporter adjacent to an upper side of the first substrate; a second supporter located between the first substrate and the second substrate; and a third supporter located in a lower side of the second substrate.

Each of the first supporter, the second supporter, and the third supporter may be provided in plurality.

The extension portion of the first supporter may include a lower extension portion which extends downward from a distal end of a protruding portion of the first supporter, and which is in contact with a front surface of the first substrate.

The extension portion of the second supporter may include: an upper extension portion which extends upward from a distal end of a protruding portion of the second supporter, and which is in contact with a front surface of the first substrate; and a lower extension portion which extends downward from the distal end of the protruding portion of the second supporter, and which is in contact with a front surface of the second substrate.

The extension portion of the third supporter may include an upper extension portion which extends upward from a distal end of a protruding portion of the third supporter, and which is in contact with a front surface of the second substrate.

The display device may further include: a first adhesive member which is adjacent to a left side of the frame, and which is coupled to a front surface of the frame; and a second adhesive member which is adjacent to a right side of the frame, and which is coupled to the front surface of the frame, and each of the first substrate and the second substrate may include: a first portion which is located in front of the first adhesive member, and which is coupled to the first adhesive member; and a second portion which is located in front of the second adhesive member, and which is coupled to the second adhesive member.

The substrate may include: a quadrangular plate; a fork-shaped plate including a vertical plate, and a plurality of horizontal plates intersecting the vertical plate; or a plurality of bars extending in a horizontal direction, and spaced apart from each other in a vertical direction.

The frame may further include a recessed portion which is formed while being recessed from a front surface of the frame in a rear direction, which extends in a length direction of the body, and in which the body is seated, and the supporter may include a coupling portion which protrudes in a rear direction from a rear surface of the body, and which is detachably coupled to the recessed portion.

The coupling portion may include a first coupling portion adjacent to one end of the body, and a second coupling portion adjacent to the other end of the body.

The recessed portion may further include: a slot formed by penetrating the recessed portion, and extending in a length direction of the recessed portion; a hooking hole formed by penetrating the recessed portion, and spaced apart from the slot in the length direction of the recessed portion; and an insertion hole formed by penetrating the recessed portion, and opposite to the hooking hole with respect to the slot, and the coupling portion may include: a first part formed at a rear surface of the body, and penetrating the slot; a second part extending in a direction in which the slot and the hooking hole are spaced apart from a distal end of the first part; a third part formed at a distal end of the second part, and hooked to the hooking hole; and a protrusion formed at the rear surface of the body, and inserted into the insertion hole.

The recessed portion may further include a stopper formed at the rear surface of the body, located between the first part and the protrusion, and inserted into the slot, the first part may be hooked to one end of the slot, and the stopper may be hooked to the other end of the slot.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

The above detailed description should not be construed as restrictive in all respects and should be considered as illustrative. The scope of the present disclosure should be determined by a reasonable interpretation of the appended claims, and all modifications within the equivalent scope of the present disclosure are included in the scope of the present disclosure.

The invention claimed is:

1. A display device comprising:
   a display panel;
   a frame located at a rear of the display panel;
   a substrate located between the display panel and the frame;
   a light source located on the substrate; and
   a supporter which is adjacent to one side of the substrate, which is coupled to the frame, and which has a groove into which the one side of the substrate is inserted,
   wherein the supporter comprises:
   a body extending along the one side of the substrate, and located between the substrate and the frame; and
   a holder including a protruding portion that protrudes forward from a front surface of the body, and an extension portion that extends from a distal end of the protruding portion in a direction intersecting the body and the protruding portion,
   wherein the groove is formed between the extension portion and the body,
   wherein the extension portion comprises a hooking portion which protrudes toward the substrate from a distal end of the extension portion, and
   wherein the substrate comprises a hole or a groove which is formed at a front surface of the substrate, and to which the hooking portion is hooked.

2. The display device of claim 1, wherein the holder comprises:
   a first holder adjacent to one end of the body; and
   a second holder adjacent to the other end of the body.

3. The display device of claim 1, wherein the extension portion has a length in a length direction of the body, and is in contact with a front surface of the substrate.

4. The display device of claim 1, wherein the substrate comprises a plurality of substrates which are adjacent to each other while being spaced apart from each other,
   wherein the supporter is located between the plurality of substrates in a direction intersecting a length direction of the body.

5. The display device of claim 4, wherein the plurality of substrates comprise:
   a first substrate adjacent to an upper side of the frame; and
   a second substrate adjacent to a lower side of the frame,
   wherein the supporter further comprises:
   a first supporter adjacent to an upper side of the first substrate;
   a second supporter located between the first substrate and the second substrate; and
   a third supporter located in a lower side of the second substrate.

6. The display device of claim 5, wherein each of the first supporter, the second supporter, and the third supporter is provided in plurality.

7. The display device of claim 5, wherein the extension portion of the first supporter comprises a lower extension portion which extends downward from a distal end of a protruding portion of the first supporter, and which is in contact with a front surface of the first substrate.

8. The display device of claim 5, wherein the extension portion of the second supporter comprises:
   an upper extension portion which extends upward from a distal end of a protruding portion of the second supporter, and which is in contact with a front surface of the first substrate; and
   a lower extension portion which extends downward from the distal end of the protruding portion of the second supporter, and which is in contact with a front surface of the second substrate.

9. The display device of claim 5, wherein the extension portion of the third supporter comprises an upper extension portion which extends upward from a distal end of a protruding portion of the third supporter, and which is in contact with a front surface of the second substrate.

10. The display device of claim 5, further comprising:
a first adhesive member which is adjacent to a left side of the frame, and which is coupled to a front surface of the frame; and
a second adhesive member which is adjacent to a right side of the frame, and which is coupled to the front surface of the frame,
wherein each of the first substrate and the second substrate comprises:
a first portion which is located in front of the first adhesive member, and which is coupled to the first adhesive member; and
a second portion which is located in front of the second adhesive member, and which is coupled to the second adhesive member.

11. The display device of claim 1, wherein the substrate comprises:
a quadrangular plate;
a fork-shaped plate including a vertical plate, and a plurality of horizontal plates intersecting the vertical plate; or
a plurality of bars extending in a horizontal direction, and spaced apart from each other in a vertical direction.

12. The display device of claim 1, wherein the frame further comprises a recessed portion which is formed while being recessed from a front surface of the frame in a rear direction, which extends in a length direction of the body, and in which the body is seated,
wherein the supporter comprises a coupling portion which protrudes in a rear direction from a rear surface of the body, and which is detachably coupled to the recessed portion.

13. The display device of claim 12, wherein the recessed portion further comprises:
a slot formed by penetrating the recessed portion, and extending in a length direction of the recessed portion;
a hooking hole formed by penetrating the recessed portion, and spaced apart from the slot in the length direction of the recessed portion; and
an insertion hole formed by penetrating the recessed portion, and opposite to the hooking hole with respect to the slot,
wherein the coupling portion comprises:
a first part formed at a rear surface of the body, and penetrating the slot;
a second part extending in a direction in which the slot and the hooking hole are spaced apart from a distal end of the first part;
a third part formed at a distal end of the second part, and hooked to the hooking hole; and
a protrusion formed at the rear surface of the body, and inserted into the insertion hole.

14. The display device of claim 13, wherein the recessed portion further comprises a stopper formed at the rear surface of the body, located between the first part and the protrusion, and inserted into the slot,
wherein the first part is hooked to one end of the slot,
wherein the stopper is hooked to the other end of the slot.

* * * * *